United States Patent
Jha et al.

(10) Patent No.: US 11,785,655 B2
(45) Date of Patent: Oct. 10, 2023

(54) METHOD AND SYSTEM FOR PROVIDING 5G SERVICES TO USER EQUIPMENT IN WIRELESS COMMUNICATION NETWORK

(71) Applicant: Samsung Electronics Co., Ltd., Suwon-si (KR)

(72) Inventors: Kailash Kumar Jha, Bangalore (IN); Alok Kumar Jangid, Bangalore (IN); Govind Irappa Uttur, Bangalore (IN); Mudit Goel, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/547,362

(22) Filed: Aug. 21, 2019

(65) Prior Publication Data

US 2020/0100309 A1 Mar. 26, 2020

(30) Foreign Application Priority Data

Aug. 21, 2018 (IN) .............................. 201841031344
Aug. 9, 2019 (IN) .............................. 201841031344

(51) Int. Cl.
*H04W 76/15* (2018.01)
*H04W 76/25* (2018.01)
(Continued)

(52) U.S. Cl.
CPC ........... *H04W 76/15* (2018.02); *H04W 60/00* (2013.01); *H04W 76/19* (2018.02); *H04W 76/25* (2018.02); *H04W 76/27* (2018.02)

(58) Field of Classification Search
CPC ............. H04W 36/0022; H04W 48/18; H04W 60/00; H04W 76/15; H04W 76/16;
(Continued)

(56) References Cited

U.S. PATENT DOCUMENTS

2011/0194505 A1 8/2011 Faccin et al.
2012/0014324 A1 1/2012 Dwyer et al.
(Continued)

FOREIGN PATENT DOCUMENTS

WO 2017/172265 A1 10/2017
WO 2018038497 A1 3/2018

OTHER PUBLICATIONS

3GPP TS 23.501 V15.2.0 (Jun. 2018); Technical Specification 3rd Generation Partnership Project; Technical Specification Group Services and System Aspects; System Architecture for the 5G System; (Year: 2018).*
China Unicom, "Support of EPS fallback—23.501", SA WG2 Meeting #122bis, Aug. 21-25, 2017, S2-175486, 3 pages.
(Continued)

*Primary Examiner* — Derrick W Ferris
*Assistant Examiner* — M Mostazir Rahman

(57) ABSTRACT

Embodiments herein provide a method for providing 5G services to user equipment (UE) (100) in a wireless communication network. The method comprising registering, by the UE (100), to a 5G network with a usage setting as voice centric and detecting, by the UE (100), an unavailability of at least one of a voice over long term evolution (VOLTE) service and a voice over new radio (VOLAR) service at the UE (100). Further, the method includes configuring the UE (100) to operate in one of a single radio 5G (SR5G) mode, an evolved-Universal Terrestrial Radio Access (E-UTRAN) New Radio-Dual Connectivity (ENDC) mode and provide data services dynamically on one of a 4G network and a 5G network.

8 Claims, 24 Drawing Sheets

(51) Int. Cl.
*H04W 76/19* (2018.01)
*H04W 76/27* (2018.01)
*H04W 60/00* (2009.01)

(58) Field of Classification Search
CPC ..... H04W 76/19; H04W 76/25; H04W 76/27; H04W 88/06; H04L 65/1016; H04L 65/1073
See application file for complete search history.

(56) References Cited

U.S. PATENT DOCUMENTS

| | | |
|---|---|---|
| 2014/0018075 A1 | 1/2014 | Verger et al. |
| 2014/0334442 A1 | 11/2014 | Kanamarlapudi et al. |
| 2015/0139076 A1 | 5/2015 | Keller et al. |
| 2016/0073317 A1 | 3/2016 | Khay-Ibbat et al. |
| 2016/0262004 A1 | 9/2016 | Telang et al. |
| 2017/0201911 A1 | 7/2017 | Ng et al. |
| 2018/0132141 A1* | 5/2018 | Huang-Fu ............. H04W 36/30 |
| 2018/0227790 A1 | 8/2018 | Mahmood |
| 2019/0191349 A1 | 6/2019 | Kim et al. |
| 2019/0268950 A1* | 8/2019 | Youtz .................... H04W 76/30 |
| 2020/0008069 A1* | 1/2020 | Zhu ........................ H04W 16/14 |
| 2020/0015303 A1* | 1/2020 | Tsai ....................... H04W 8/183 |
| 2020/0053134 A1* | 2/2020 | Niemi ................. H04L 65/1073 |
| 2020/0053616 A1* | 2/2020 | Zhu ................... H04W 36/0027 |
| 2021/0185567 A1* | 6/2021 | Zhang .................... H04W 8/08 |
| 2021/0314849 A1* | 10/2021 | Tiwari .................. H04W 60/00 |

OTHER PUBLICATIONS

Huawei, HiSilicon, "Clarification on access network information during IMS call in 5G dual connectivity scenario", Change Request, 3GPP TSG-SA WG2 Meeting #128, Jul. 2-6, 2018, s2-186557, 4 pages.
International Search Report dated Dec. 2, 2019 in connection with International Patent Application No. PCT/KR2019/010651, 3 pages.
Written Opinion of the International Searching Authority dated Dec. 2, 2019 in connection with International Patent Application No. PCT/KR2019/010651, 5 pages.
Supplementary Partial European Search Report dated Jul. 27, 2021, in connection with European Patent Application No. 19851246.9, 10 pages.
Examination report under sections 12 & 13 of the Patents Act, 1970 and the Patents Rules, 2003 dated Jun. 2, 2021, in connection with Indian Patent Application No. 201841031344, 5 pages.
CMCC, "The support of Voice over standalone NR", 3GPP TSG RAN Meeting #78, RP-172374, Lisbon, Portugal, Dec. 18-21, 2017, 3 pages.
Intel, et al., "EPS fallback", SA WG2 Meeting #122, S2-174550, (revision of S2-17xxxx) Jun. 26-30, 2017, San Jose Del Cabo, Mexico, 4 pages.
Qualcomm Incorporated, "UE Radio Capability for IMS Voice", 3GPP TSG-RAN WG2 Meeting #103, R2-1811127 (Resubmission of R2-1809486), Gothenburg, Sweden, Aug. 20-24, 2018, 6 pages.
European Patent Office, "Communication pursuant to Article 94(3) EPC," dated May 26, 2023, in connection with European Patent Application No. 19851246.9, 4 pages.

* cited by examiner

METHOD AND SYSTEM FOR PROVIDING 5G SERVICES TO USER EQUIPMENT IN WIRELESS COMMUNICATION NETWORK

CROSS-REFERENCE TO RELATED APPLICATIONS

This application is based on and claims priority under 35 U.S.C. § 119 to Indian Provisional Patent Application Serial No. 201841031344 (PS) filed on Aug. 21, 2018, and Indian Complete Patent Application Serial No. 201841031344 (CS) filed on Aug. 9, 2019 in the Indian Intellectual Property Office, the disclosures of which are herein incorporated by reference in their entirety.

BACKGROUND

1. Field

The embodiments herein relate to wireless communication, and more particularly, to a method and system for providing $5^{th}$ generation (5G) services to a user equipment (UE) in a wireless communication network. The present application is based on, and claims priority from an Indian Application Number 201841031344 filed on 21 Aug. 2018, the disclosure of which is hereby incorporated by reference herein.

2. Description of Related Art

Generally with the advancement in a wireless communication technology, some user equipments (UEs) are capable of receiving signals from two or more Radio Access Technologies (RATs) using a single radio. A mode which enables a UE to receive the signals from two or more RATs is known as Single Radio Long Term Evolution (SRLTE) mode. In the SRLTE mode the simultaneously receives signals from an LTE wireless network and a Code Division Multiple Access (CDMA) 2000 1× wireless network. Consider a single registration stand-alone (SA) 5G capable UE with single radio which is registered to a 5G network and a 4G network. If the 5G network does not support a Voice over New Radio (VoNR), the UE will provide voice services either on the LTE or on the CDMA 2000 1× wireless network in the SRLTE mode. However, due to the UE providing the voice services either on the LTE or on the CDMA 2000 1× wireless network leads to the UE losing the 5G services, though the 5G service is available. In case of a dual registration SA UE with Dual Radio/Single Radio, both the 4G services and the 5G services are not supporting the VOLTE. Then the UE will operate in the SRLTE mode only and the UE will again loose the 5G services, though the 5G service is available.

The above information is presented as background information only to help the reader to understand the present invention. Applicants have made no determination and make no assertion as to whether any of the above might be applicable as prior art with regard to the present application.

SUMMARY

The principal object of the embodiments herein is to provide a method and system for providing 5G services to a user equipment (UE) in a wireless communication network.

Another object of the embodiments herein is to detect an unavailability of at least one of a voice over long term evolution (VOLTE) service and a voice over new radio (VOLAR) service at the UE.

Another object of the embodiments herein is to configure the UE to operate in one of a single radio 5G (SR5G) mode, an evolved-Universal Terrestrial Radio Access (E-UTRAN) New Radio-Dual Connectivity (ENDC) mode and provide data services dynamically on one of a 4G network and a 5G network.

Another object of the embodiments herein is to allow the UE to provide a 5G data services at the UE when the UE is in an idle mode on a 1× core.

Another object of the embodiments herein is to allow the UE to provide 4G service and 5G services by dynamically switching between a single radio long term evolution (SRLTE) mode and the SR5G mode.

Another object of the embodiments herein is to automatically switch to the SR5G mode which allows the UE to be simultaneously registered to the 5G network and the 1× core on a single transceiver.

Accordingly, the embodiments herein provide a method for providing 5G services to a user equipment (UE) in a wireless communication network. The method comprising registering, by the UE, to a $5^{th}$ generation (5G) network with a usage setting as voice centric and detecting, by the UE, an unavailability of at least one of a voice over long term evolution (VOLTE) service and a voice over new radio (VOLAR) service at the UE. Further, the method includes configuring the UE to operate in one of a single radio 5G (SR5G) mode, an evolved-Universal Terrestrial Radio Access (E-UTRAN) New Radio-Dual Connectivity (ENDC) mode and provide data services dynamically on one of a 4G network and a 5G network.

Accordingly, the embodiments herein provide a user equipment (UE) for providing 5G services in a wireless communication network. The UE comprises a memory and a processor coupled to the memory. The processor is configured to register to a 5G network with a usage setting as voice centric and detect an unavailability of at least one of a voice over long term evolution (VOLTE) service and a voice over new radio (VOLAR) service at the UE. Further, the processor is configured to configure the UE to operate in one of a single radio 5G (SR5G) mode, an evolved-Universal Terrestrial Radio Access (E-UTRAN) New Radio-Dual Connectivity (ENDC) mode and provide data services dynamically on one of a 4G network and a 5G network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
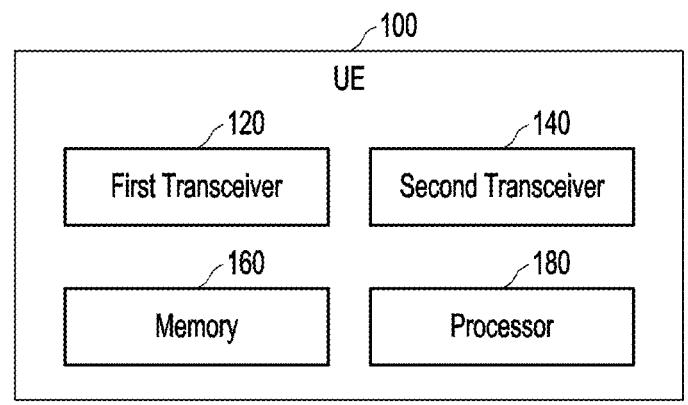
FIG. 1A illustrates a block diagram of a UE for providing 5G services, according to an embodiment as disclosed herein.

FIGS. 1A through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Throughout the disclosure, the expression "at least one of a, b or c" indicates only a, only b, only c, both a and b, both a and c, both b and c, all of a, b, and c, or variations thereof.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for providing 5G services to user equipment (UE) in a wireless communication network. The method comprising registering, by the UE, to a 5G network with a usage setting as voice centric and detecting, by the UE, an unavailability of at least one of a voice over long term evolution (VOLTE) service and a voice over new radio (VOLAR) service at the UE. Further, the method includes configuring the UE to operate in one of a single radio 5G (SR5G) mode, an evolved-Universal Terrestrial Radio Access (E-UTRAN) New Radio-Dual Connectivity (ENDC) mode and provide data services dynamically on one of a 4G network and a 5G network.

In an embodiment, configuring the UE to operate in the SR5G mode includes allowing the UE to provide one of 5G data services at the UE when the UE is in an idle mode on a 1× core and 4G service and 5G service by dynamically switching between a SRLTE mode and the SR5G mode.

In an embodiment, configuring the UE to operate in the SR5G mode to provide 5G data services when the UE is in an idle mode on the 1× core includes determining, by the UE, whether the VOLTE service needs to be checked based on a user preference, an operator preference and a proprietary rule. Further, the method includes registering, by the UE, to a 4G network with usage setting as voice centric in response to determining that the VOLTE service needs to be checked and determining, by the UE, that the VOLTE service is not available in the 4G network. The method also includes automatically switching, by the UE, to the SR5G mode from the 4G network, wherein the SR5G mode allows the UE to be simultaneously registered to the 5G network and the 1× core on a single transceiver and re-registering, by the UE, to the 5G network and the 1× core for providing the 5G services to the UE due to the unavailability of the VOLTE service and unavailability of the VOLAR service.

In an embodiment, determining by the UE, that the VOLTE service need not to be checked include automatically switching, by the UE, to the SR5G mode from the 5G network, wherein the SR5G mode allows the UE to be simultaneously registered to the 5G network and the 1× core on the single transceiver and re-registering, by the UE, to the 5G network and the 1× core for providing the 5G services to the UE due to the unavailability of the VOLTE service and unavailability of the VOLAR service.

In an embodiment, the method further includes initiating, by the UE, a call on the 1× core and sending, by the UE, a message to the 5G network to move the UE to a RRC_INACTIVE state, where in the RRC_INACTIVE state of the 5G network is suspended. Furthermore, the method includes determining, by the UE, that the call on the 1× core is ended and sending, by the UE, a resume request message to the 5G network, wherein the resume request message resumes the 5G Services at the UE by moving the UE to a RRC connected state.

In an embodiment, the UE is a single registration supported single radio device.

In an embodiment, configuring the UE to operate in the SR5G mode to provide the 4G services and the 5G services at the UE by dynamically switching between the SRLTE mode and the SR5G mode includes registering, by the UE, to a 4G network with usage setting as voice centric. Further, the method includes determining, by the UE, that the VOLTE service is unavailable in the 4G network and switching dynamically, by the UE, to one of the SR5G mode and the SRLTE mode based on a user preference, an operator preference, an active Public data network (PDN) on one of a 4G Radio Access Technology (RAT) and a 5G RAT, an active data network name (DNN) on one of the 4G RAT and the 5G RAT, an application data request, a user history, a signal quality, a transmission power limitation, wherein the SR5G mode allows the UE to be simultaneously registered to the 5G network and the 1× core on the single transceiver.

In an embodiment, switching dynamically, by the UE, to the SR5G mode includes initiating, by the UE, a call on the 1× core and sending, by the UE, a Non-access stratum (NAS) message to the 5G network to move the UE to a RRC_INACTIVE state, where in the RRC_INACTIVE state the registration on the 5G network is suspended. Further, the method includes determining, by the UE, that the call on the 1× core is ended and sending, by the UE, a resume request message to the 5G network, wherein the resume request message resumes the 5G Services of the UE by moving the UE to a RRC connected state.

In an embodiment, the UE is a dual registration supported single radio device.

In an embodiment, configuring the UE to provide the data services dynamically on one of the 4G network and the 5G network includes registering, by the UE, to the 4G network on a first transceiver (T1) without the VOLTE service, wherein the UE is registered to the 5G network on a second transceiver (T2) and wherein the UE is registered on the 5G network and the 4G network on a dual registration mode with a dual radio and registering, by the UE, to the 1× core using the T1. Further, the method includes initiating, by the UE, a voice call on the T1 and activating the 1× core on the T1 and dynamically providing, by the UE, data on one of the 5G network and the 4G network based on at least one of a user preference, an operator preference, an active Public data network (PDN) on one of a 4G Radio Access Technology (RAT) and a 5G RAT, an active data network name (DNN) on one of the 4G RAT and the 5G RAT, an application data request during a call, a user history, a signal quality, a transmission power limitation and interference with call signal on the T2. Furthermore, the method also includes performing, by the UE, one of a Protocol Data Unit (PDU) handover from a non-active Radio Access Technology (RAT) to an active RAT, suspending the PDU the non-active RAT and suspend the 4G RAT and the 5G RAT and determining, by the UE, that the call on the 1× core is ended. The method also includes performing, by the UE, one of resume the RAT which was suspended by sending a TAU message in 4G network and mobility registration update/resume request in 5G network, handover the PDUs back to the RAT from which was moved before the call.

In an embodiment, the 4G RAT is suspended by sending an extended service request and the 5G RAT is suspended by sending a NAS message.

In an embodiment, configuring the UE to operate in the ENDC mode includes determining, by the UE, a capability to operate in an evolved-Universal Terrestrial Radio Access (E-UTRAN) New Radio-Dual Connectivity (ENDC) mode, where the ENDC mode supports the VOLTE services and the 5G services and switching, by the UE, to the ENDC mode from a standalone (SA) mode for providing the 5G services to the UE on the unavailability of the VOLAR service.

Referring now to the drawings, and more particularly to FIGS. 1 through 7B, where similar reference characters denote corresponding features consistently throughout the figures, there are shown preferred embodiments and prior arts for comparison with the preferred embodiments.

FIG. 1A illustrates a block diagram of the UE (100) for providing the 5G services, according to an embodiment as disclosed herein.

Referring to the FIG. 1A, the UE (100) can be, for example, a mobile phone, a smart phone, Personal Digital Assistant (PDA), a tablet, a wearable device, or the like. In an embodiment, the UE (100) can include a first transceiver (120), a second transceiver (140), a memory (160) and a processor (180).

In an embodiment, the first transceiver (T1) (120) and the second transceiver (T2) (140) are configured to communicate with various components of the 4G network and the 5G network. The UE (100) registers to the 4G network on the first transceiver (120) without the VOLTE service and the UE (100) also register to the 5G network on the second transceiver (T2), when the UE (100) is operated in the dual registration mode with dual radio. In general, the UE (100) registers to one of the 4G network, the 5G network and the 1× core (1000) using one of the first transceiver (120) and the second transceiver (140) when the UE (100) operates in the dual registration and single radio mode or the single registration single radio mode.

In an embodiment, the memory (160) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (160) may, in some examples, be considered a non-transitory storage medium. The term "non-transitory" may indicate that the storage medium is not embodied in a carrier wave or a propagated signal. However, the term "non-transitory" should not be interpreted that the memory (160) is non-movable. In some examples, the memory (160) is configured to store larger amounts of information than the memory. In certain examples, a non-transitory storage medium may store data that can, over time, change (e.g., in Random Access Memory (RAM) or cache).

In an embodiment, the processor (180) is configured to initiate the registration of the UE (100) to the 5G network with the usage setting as voice centric. Further, the processor (180) is configured to detect the unavailability of at least one of the voice over long term evolution (VOLTE) service and the voice over new radio (VOLAR) service at the UE (100). The statement, the VoNR is not supported in the complete embodiments implicitly means that the VoNR is not supported on both the 3GPP and the N3GPP access on the NR. The processor (180) is also configured to operate in one of the single radio 5G (SR5G) mode, the ENDC mode and provide data services dynamically on one of the 4G network and the 5G network. The SR5G mode allows the UE (100) to be simultaneously registered to the 5G network and the 1× core 1000 on the single transceiver. In the SR5G mode, the processor (180) allows the UE (100) to provide one of the 5G data services at the UE (100) when the UE (100) is in the idle mode on the 1× core (1000) and the 4G services and the 5G services at the UE (100) by dynamically switching between the SRLTE mode and the SR5G mode.

Although the FIG. 1A shows the hardware elements of the UE (100) but it is to be understood that other embodiments are not limited thereon. In other embodiments, the UE (100) may include less or a greater number of elements. Further, the labels or names of the elements are used only for illustrative purpose and does not limit the scope of the invention. One or more components can be combined together to perform same or substantially similar function.

Figure 1B:
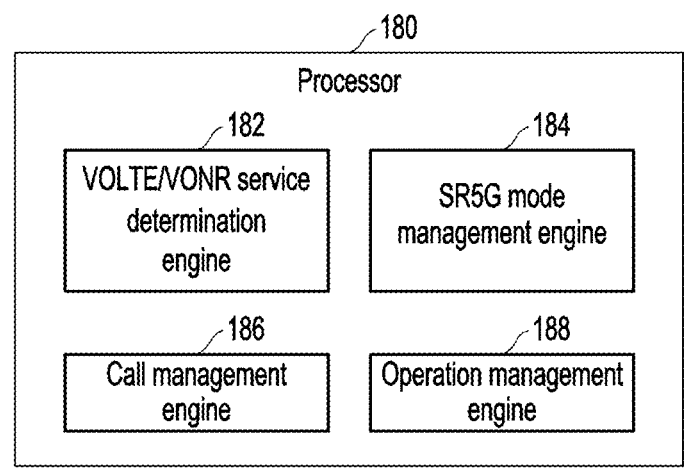
FIG. 1B illustrates a block diagram of a processor of the UE for providing 5G services in the wireless communication network, according to an embodiment as disclosed herein.

FIG. 1B illustrates a block diagram of the processor (180) of the UE (100) for providing 5G services in the wireless communication network, according to an embodiment as disclosed herein.

Referring to the FIG. 1B, the processor (180) of the UE (100) includes a VOLTE/VOLAR service determination engine (182), a SR5G mode management engine (184), a call management engine (186) and an operation management engine (188).

In an embodiment, the VOLTE/VOLAR service determination engine (182) is configured to detect the unavailability of at least one of the VOLTE service and the VOLAR service at the UE (100). The VOLTE/VOLAR service determination engine (182) is also configured to determine whether the VOLTE service needs to be checked based on the user preference, the operator preference and the proprietary rule when the UE (100) operates in the single registration with single radio, as described in FIG. 4F.

In an embodiment, the SR5G mode management engine (184) is configured operate the UE (100) in the SR5G AND provide one of the 5G data services when the UE (100) is in the idle mode on the 1× core (1000) and the 4G services and the 5G services by dynamically switching between the SRLTE mode and the SR5G mode. The SR5G mode allows the UE (100) to be simultaneously registered to the 5G network and the 1× core (1000) on the single transceiver.

In an embodiment, the call management engine (186) is configured to initiate the call on the 1× core (1000), monitor the call and determine the end of the call.

In an embodiment, the operation management engine (188) is also configured to send the message to the 5G network to move the UE (100) to a RRC_INACTIVE state where the registration on the 5G network is suspended, when the transceiver needs to be used to accommodate the call on the 1× core (1000) in the single registration with single radio mode. The operation management engine (188) is also configured to send the resume request message to the 5G network to resume the 5G services at the UE (100) by moving the UE (100) to an RRC connected state.

In another embodiment, the UE (100) operates in the SR5G mode to provide the 4G services and the 5G services by dynamically switching between the SRLTE mode and the SR5G mode. The operation management engine (188) is configured to switch dynamically between the SR5G mode and the SRLTE mode based on the user preference, the operator preference, the active Public data network (PDN) on one of the 4G Radio Access Technology (RAT) and the 5G RAT, the active data network name (DNN) on one of the 4G RAT and the 5G RAT, the application data request, the user history, the signal quality, the transmission power limitation. In this case, the UE (100) operates in the dual registration with single radio mode.

In another embodiment, the operation management engine (188) is configured to dynamically provide data on one of the 5G network and the 4G network based on at least one of the user preference, the operator preference, the active Public data network (PDN) on one of the 4G Radio Access Technology (RAT) and the 5G RAT, the active data network name (DNN) on one of the 4G RAT and the 5G RAT, the application data request during the call, the user history, the signal quality, the transmission power limitation and interference with call signal. Further, the operation management engine (188) performs one of the Protocol Data Unit (PDU) handover from the non-active Radio Access Technology (RAT) to the active RAT, suspending the PDU the non-active RAT and suspend the 4G RAT and the 5G RAT while dynamically providing data on one of the 5G network and the 4G network. In this case, the UE (100) operates in the dual registration with dual radio mode.

In another embodiment, the operation management engine (188) determines the capability of the UE (100) to operate in the ENDC mode and switches to the ENDC mode from a standalone (SA) mode for providing the 5G services to the UE (100) on the unavailability of the VOLAR service.

Figure 2A:
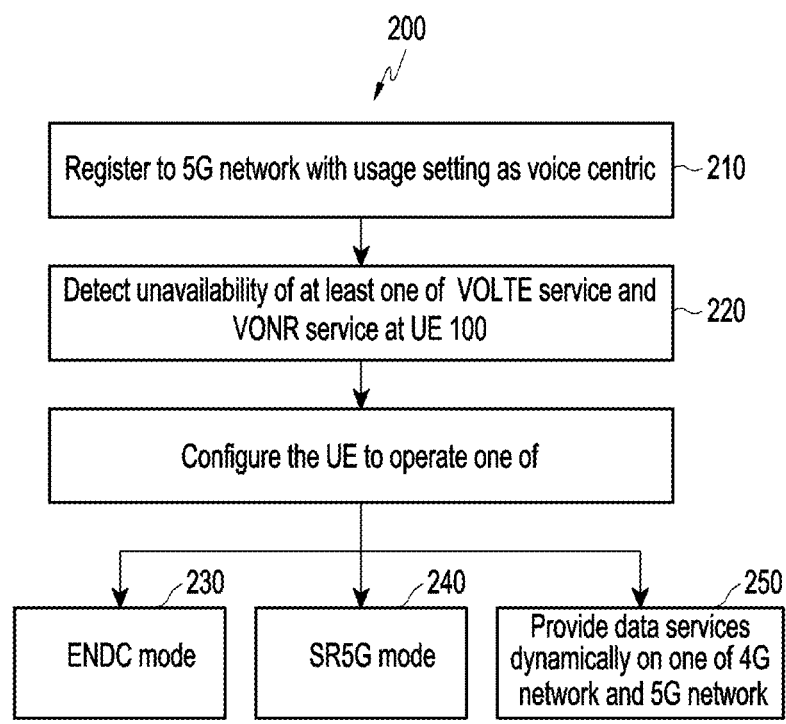
FIG. 2A illustrates a flow chart of a method for providing the 5G services to the UE in the wireless communication network, according to an embodiment as disclosed herein.

FIG. 2A illustrates a flow chart 200 of a method for providing 5G services to the UE (100) in the wireless communication network, according to an embodiment as disclosed herein.

Referring to the FIG. 2A, at step 210, the UE (100) registers to the 5G network with usage setting as voice centric. For example, in the UE (100) as illustrated in the FIG. 1A, the processor (180) can be configured to register to the 5G network with usage setting as voice centric.

At step 220, the UE (100) detects the unavailability of at least one of the VOLTE service and the VOLAR service at UE (100). For example, in the UE (100) as illustrated in the FIG. 1A, the processor (180) can be configured to detect the unavailability of at least one of the VOLTE service and the VOLAR service at UE (100).

The UE (100) is configured to operate one of at step 230, in the ENDC mode, at step 240, in the SR5G mode and at step 250, to provide data services dynamically on one of the 4G network and the 5G network. For example, in the UE (100) as illustrated in the FIG. 1A, the processor (180) can be configured to operate the UE (100) in one of at step 230, in the ENDC mode, at step 240, in the SR5G mode and at step 250, to provide data services dynamically on one of the 4G network and the 5G network.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 2B:
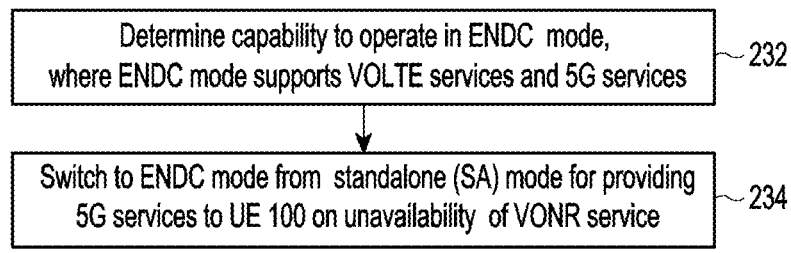
FIG. 2B illustrates a flow chart of a method for providing the 5G services to the UE in an evolved-Universal Terrestrial Radio Access (E-UTRAN) New Radio-Dual Connectivity (ENDC) mode during a non-VOLAR scenario, according to an embodiment as disclosed herein.

FIG. 2B illustrates a flow chart of a method for providing 5G services to the UE (100) in the ENDC mode during the non-VOLAR scenario, according to an embodiment as disclosed herein.

Referring to the FIG. 2B, at step 232 the UE (100) determines the capability to operate in the ENDC mode, where the ENDC mode supports the VOLTE services and the 5G services. For example, in the UE (100) as illustrated in the FIG. 1A, the processor (180) can be configured to determine the capability to operate in the ENDC mode, where the ENDC mode supports the VOLTE services and the 5G services.

At step 234, the UE (100) switches to the ENDC mode from the standalone (SA) mode for providing the 5G services to the UE (100) on the unavailability of the VOLAR service. For example, in the UE (100) as illustrated in the FIG. 1A, the processor (180) can be configured to switch to the ENDC mode from the standalone (SA) mode for providing the 5G services to the UE (100) on the unavailability of the VOLAR service.

Figure 2C:
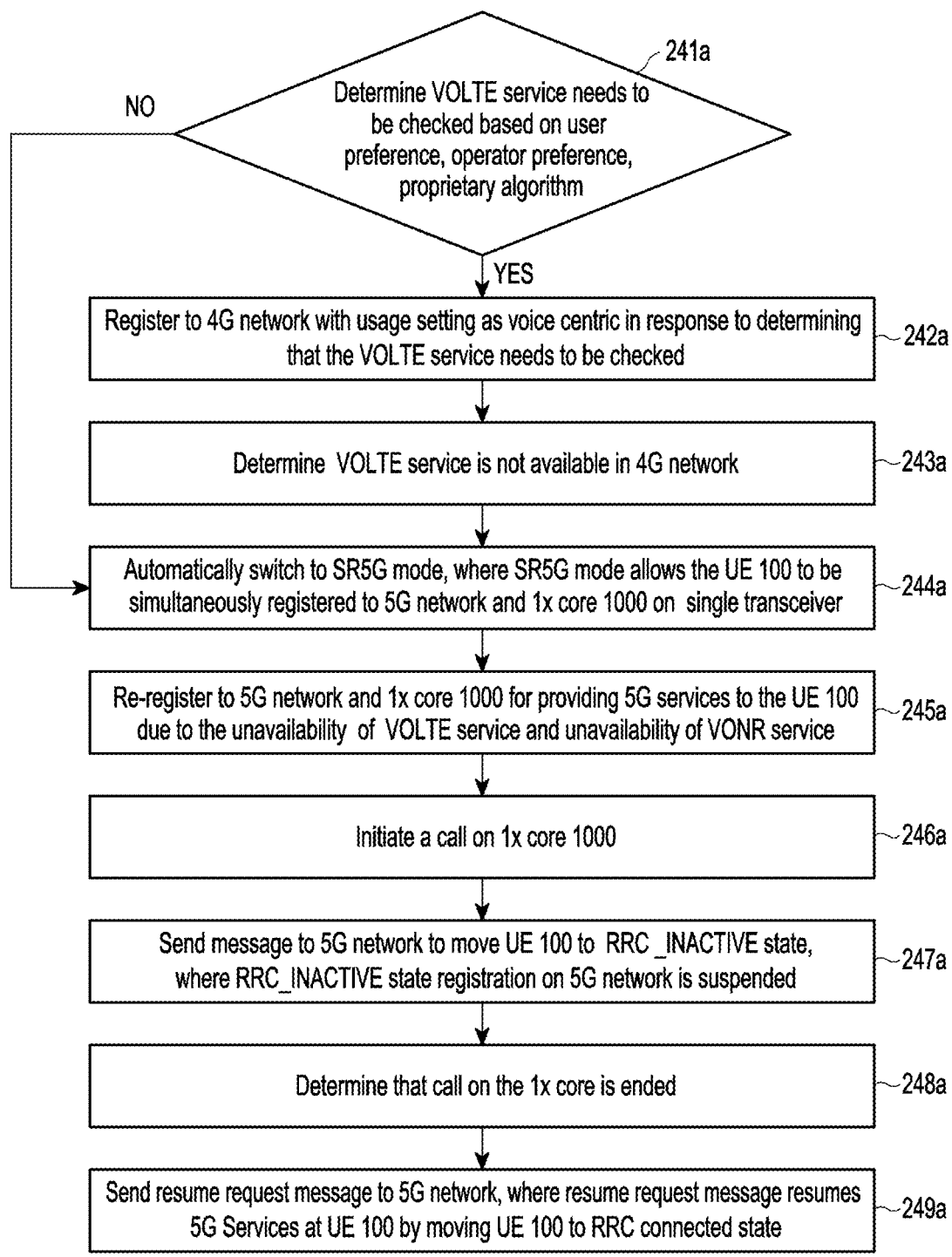
FIG. 2C illustrates a flow chart of a method for providing the 5G services to the UE in the wireless communication network in a SR5G mode, according to an embodiment as disclosed herein.

FIG. 2C illustrates a flow chart of a method for providing 5G services to the UE (100) in the wireless communication network, according to an embodiment as disclosed herein.

Referring to the FIG. 2C, at step 241*a*, the UE (100) determines whether the VOLTE service needs to be checked based on the user preference, the operator preference, the proprietary rule. For example, in the UE (100) as illustrated in the FIG. 1A, the processor (180) can be configured to determine whether the VOLTE service needs to be checked based on the user preference, the operator preference, the proprietary rule.

At step 242*a*, the UE (100) registers to the 4G network with usage setting as the voice centric in response to determining that the VOLTE service needs to be checked. For example, in the UE (100) as illustrated in the FIG. 1A, the processor (180) can be configured to register to the 4G network with usage setting as the voice centric in response to determining that the VOLTE service needs to be checked.

At step 243*a*, the UE (100) determines the VOLTE service is not available in the 4G network. For example, in the UE (100) as illustrated in the FIG. 1A, the processor (180) can be configured to determine the VOLTE service is not available in the 4G network.

At step 244*a*, the UE (100) automatically switches to the SR5G mode, where the SR5G mode allows the UE (100) to be simultaneously registered to the 5G network and the 1× core (1000) on the single transceiver For example, in the UE (100) as illustrated in the FIG. 1A, the processor (180) can be configured to automatically switch to the SR5G mode from the 4G network, where the SR5G mode allows the UE (100) to be simultaneously registered to the 5G network and the 1× core (1000) on the single transceiver.

At step 245*a*, the UE (100) re-registers to the 5G network and the 1× core (1000) for providing the 5G services to the UE (100) due to the unavailability of the VOLTE service and unavailability of the VOLAR service. For example, in the UE (100) as illustrated in the FIG. 1A, the processor (180) can be configured to re-register to the 5G network and the 1× core (1000) for providing the 5G services to the UE (100) due to the unavailability of the VOLTE service and unavailability of the VOLAR service.

At step 246*a*, the UE (100) initiates the call on the 1× core (1000). For example, in the UE (100) as illustrated in the FIG. 1A, the processor (180) can be configured to initiate the call on the 1× core (1000).

At step 247*a*, the UE (100) sends the message to the 5G network to move the UE (100) to the RRC_INACTIVE state, where the RRC_INACTIVE state registration on the 5G network is suspended. For example, in the UE (100) as illustrated in the FIG. 1A, the processor (180) can be configured to send the message to the 5G network to move the UE (100) to the RRC_INACTIVE state, where the RRC_INACTIVE state registration on the 5G network is suspended.

At step 248*a*, the UE (100) determines that the call on the 1× core (1000) is ended. For example, in the UE (100) as illustrated in the FIG. 1A, the processor (180) can be configured to determine that the call on the 1× core (1000) is ended.

At step 249*a*, the UE (100) sends the resume request message to the 5G network, where the resume request message resumes the 5G Services at the UE (100) by moving the UE (100) to RRC connected state. For example, in the UE (100) as illustrated in the FIG. 1A, the processor (180) can be configured to send the resume request message to the 5G network, where the resume request message resumes the 5G Services at the UE (100) by moving the UE (100) to RRC connected state.

At step 241*a*, the UE (100) determines that the VOLTE service need not be checked based on the user preference, the operator preference, and the proprietary rule. For example, in the UE (100) as illustrated in the FIG. 1A, the processor (180) can be configured to determines that the VOLTE service need not be checked based on the user preference, the operator preference, the proprietary rule.

In response to determining by the UE (100) that the VOLTE service need not be checked, the UE (100) loops to step 244*a* and automatically switches to the SR5G mode from the 5G network.

Figure 2D:
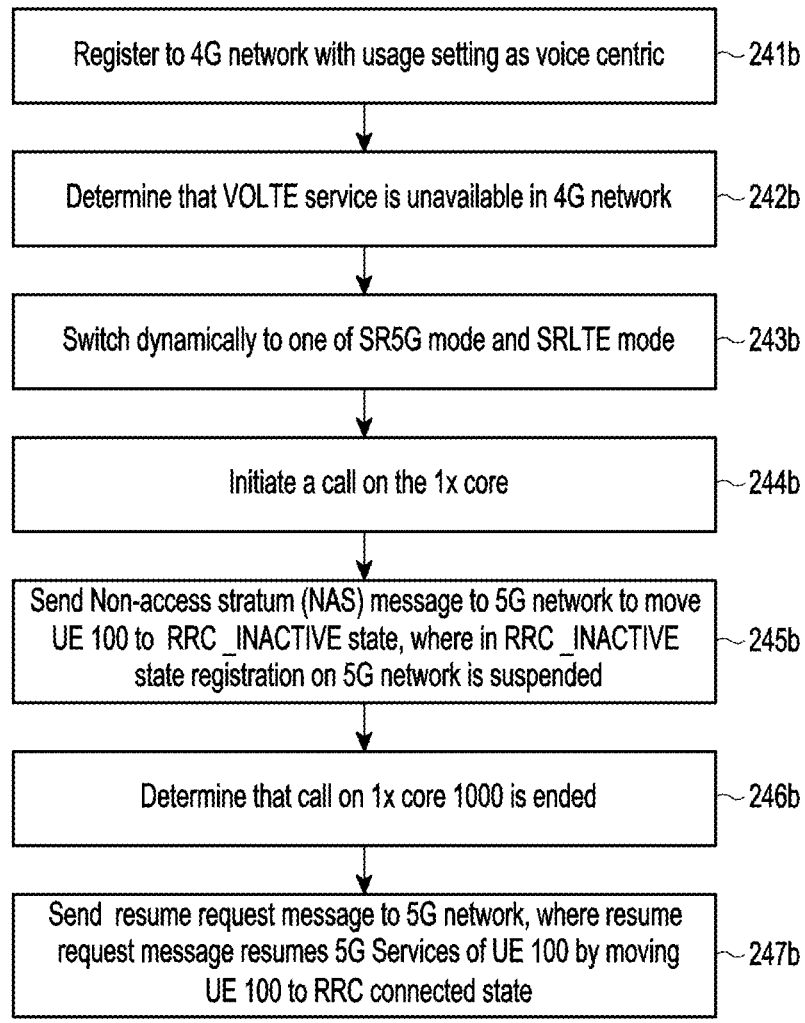
FIG. 2D illustrates a flow chart of a method for providing 4G services and the 5G services by dynamically switching between a single radio long term evolution (SRLTE) mode and the single radio 5th generation (SR5G) mode, according to an embodiment as disclosed herein.

FIG. 2D illustrates a flow chart of a method for providing the 4G services and the 5G services by dynamically switching between the SRLTE mode and the SR5G mode, according to an embodiment as disclosed herein.

Referring to the FIG. 2D, at step 241*b*, the UE (100) registers to the 4G network with usage setting as the voice centric. For example, in the UE (100) as illustrated in the FIG. 1A, the processor (180) can be configured to (100) register to the 4G network with usage setting as the voice centric.

At step 242*b*, the UE (100) determines that the VOLTE service is unavailable in the 4G network. For example, in the UE (100) as illustrated in the FIG. 1A, the processor (180) can be configured to determine that the VOLTE service is unavailable in the 4G network.

At step 243*b*, the UE (100) switches dynamically to one of the SR5G mode and the SRLTE mode. For example, in the UE (100) as illustrated in the FIG. 1A, the processor (180) can be configured to switch dynamically to one of the SR5G mode and the SRLTE mode.

At step 244*b*, the UE (100) initiates the call on the 1× core (1000). For example, in the UE (100) as illustrated in the FIG. 1A, the processor (180) can be configured to initiate the call on the 1× core (1000).

At step 245*b*, the UE (100) sends the Non-access stratum (NAS) message to the 5G network to move the UE (100) to the RRC_INACTIVE state, where the RRC_INACTIVE state registration on the 5G network is suspended. For example, in the UE (100) as illustrated in the FIG. 1A, the processor (180) can be configured to send the Non-access stratum (NAS) message to the 5G network to move the UE (100) to the RRC_INACTIVE state, where the RRC_INACTIVE state registration on the 5G network is suspended.

At step 246*b*, the UE (100) determines that the call on the 1× core (1000) is ended. For example, in the UE (100) as illustrated in the FIG. 1A, the processor (180) can be configured to determine that the call on the 1× core (1000) is ended.

At step 247*b*, the UE (100) sends the resume request message to the 5G network, where the resume request message resumes the 5G services of the UE (100) by moving the UE (100) to the RRC connected state. For example, in the UE (100) as illustrated in the FIG. 1A, the processor (180) can be configured to send the resume request message to the 5G network, where the resume request message resumes the 5G services of the UE (100) by moving the UE (100) to the RRC connected state.

Figure 2E:
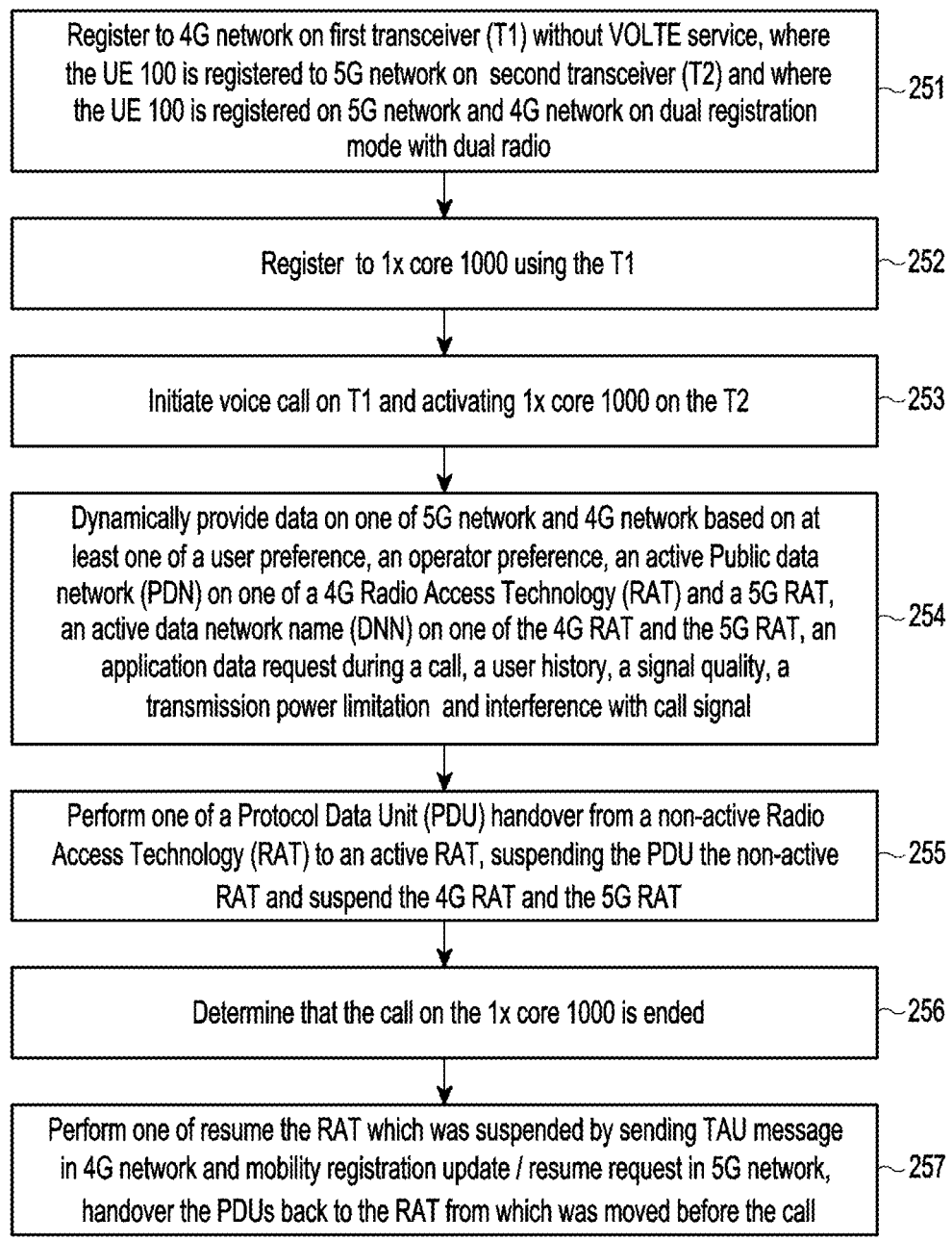
FIG. 2E illustrates a flow chart of a method for providing the 5G services to the UE, when the UE is in an idle mode on a 1× core, according to an embodiment as disclosed herein.

FIG. 2E illustrates a flow chart of a method for providing 5G services to the UE (100), when the UE (100) is in the idle mode on the 1× core (1000), according to an embodiment as disclosed herein.

Referring to the FIG. 2E, at step 251 registers to the 4G network on the first transceiver (T1) (120) without the VOLTE service, where the UE (100) is registered to the 5G network on the second transceiver (T2) (140) and the UE (100) is registered on the 5G network and the 4G network on the dual registration mode with dual radio. For example, in the UE (100) as illustrated in the FIG. 1A, the processor (180) can be configured to register to the 4G network on the first transceiver (T1) (120) without the VOLTE service, where the UE (100) is registered to the 5G network on the second transceiver (T2) (140) and the UE (100) is registered on the 5G network and the 4G network on the dual registration mode with dual radio.

At step 252, the UE (100) registers to the 1× core (1000) using the T1 (120). For example, in the UE (100) as illustrated in the FIG. 1A, the processor (180) can be configured to register to the 1× core (1000) using the T1 (120).

At step 253, the UE (100) initiates the voice call on the T1 (120) and activating the 1× core (1000) on the T1 (120). For example, in the UE (100) as illustrated in the FIG. 1A, the processor (180) can be configured to initiate the voice call on the T1 (120) and activating the 1× core (1000) on the T1 (120).

At step 254, the UE (100) dynamically provides the data on one of the 5G network and the 4G network based on at least one of the user preference, the operator preference, the active Public data network (PDN) on one of the 4G Radio Access Technology (RAT) and the 5G RAT, the active data network name (DNN) on one of the 4G RAT and the 5G RAT, the application data request during the call, the user history, the signal quality, the transmission power limitation and the interference with the call signal. For example, in the UE (100) as illustrated in the FIG. 1A, the processor (180) can be configured to dynamically provide the data on one of the 5G network and the 4G network based on at least one of the user preference, the operator preference, the active Public data network (PDN) on one of the 4G Radio Access Technology (RAT) and the 5G RAT, the active data network name (DNN) on one of the 4G RAT and the 5G RAT, the application data request during the call, the user history, the signal quality, the transmission power limitation and the interference with the call signal.

At step 255, the UE (100) performs one of the Protocol Data Unit (PDU) handover from the non-active Radio Access Technology (RAT) to the active RAT, suspending the PDU the non-active RAT and suspend the 4G RAT and the 5G RAT. For example, in the UE (100) as illustrated in the FIG. 1A, the processor (180) can be configured to perform one of the Protocol Data Unit (PDU) handover from the non-active Radio Access Technology (RAT) to the active RAT, suspending the PDU the non-active RAT and suspend the 4G RAT and the 5G RAT.

At step 256, the UE (100) determines that the call on the 1× core (1000) is ended. For example, in the UE (100) as illustrated in the FIG. 1A, the processor (180) can be configured to determine that the call on the 1× core (1000) is ended.

At step 257, the UE (100) performs one of resume the RAT which was suspended by sending TAU message in 4G network and mobility registration update/resume request in 5G network, handover the PDUs back to the RAT from which was moved before the call. For example, in the UE (100) as illustrated in the FIG. 1A, the processor (180) can be configured to perform one of resume the RAT which was suspended by sending TAU message in 4G network and mobility registration update/resume request in 5G network, handover the PDUs back to the RAT from which was moved before the call.

Figure 3A:
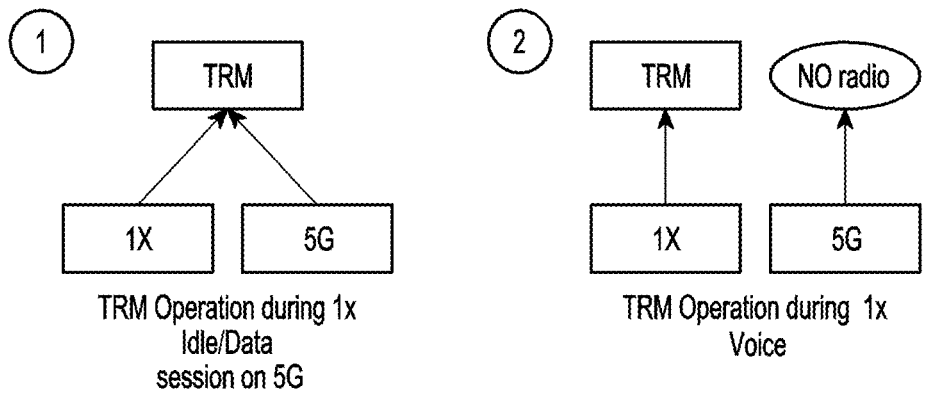
FIG. 3A illustrates a comparison between the conventional methods and the SR5G mode based on an operation of a Topology/Resource Management Module (TRM), according to an embodiment as disclosed herein.

FIG. 3A illustrates a comparison between the conventional methods and the SR5G mode based on an operation of a Topology/Resource Management Module (TRM), according to an embodiment as disclosed herein.

Referring to the FIG. 3A, at 1, as per the proposal of the Topology/Resource Management Module (TRM) when the 1× core (1000) is idle and the data session is active on the 5G network. In such a scenario, the TRM is shared between the 1× core (1000) and the 5G network.

At 2, there is a call initiated on the 1× core (1000) and the 1× core (1000) is active. Then the 1× core (1000) acquires the TRM and the 5G network does not get the TRM. Since there is a single TRM when the TRM is blocked by the 1× core (1000), the 5G network does not get to access the TRM.

Further, in case the 5G data service is allowed to access the TRM, then the call quality will be affected and glitches will be experienced during the call. Hence, during the call the TRM is made available only to the 1× core (1000).

Figure 3B:
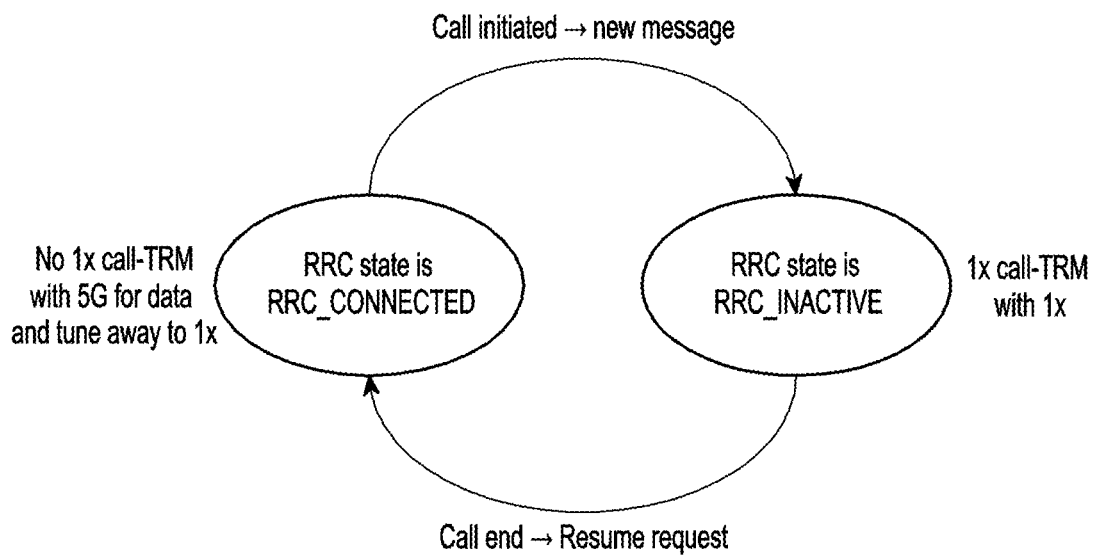
FIG. 3B illustrates a status of a radio resource control (RRC) state in the SR5G mode during a voice call, according to an embodiment as disclosed herein.

FIG. 3B illustrates a status of a radio resource control (RRC) state in the SR5G mode during the voice call, according to an embodiment as disclosed herein.

Unlike to the conventional methods and systems, in which the status of the RRC state during the voice call is set to ideal state (i.e., RRC_IDEAL) state) during the voice call where the time required to resume the RRC state is longer, in the proposed SR5G mode, the RRC state during the voice call is set to RRC_INACTIVE state, as shown in FIG. 3B.

Further, when the call is terminated, then the 1× core (1000) is idle and the data session is active on the 5G network and both the 1× core (1000) and the 5G network can access the TRM. Therefore, the status of the RRC state is changed to RRC_CONNECTED state from the RRC_INACTIVE state. Further, in the proposed SR5G mode, the change of the RRC state from the RRC_INACTIVE state to the RRC_CONNECTED state is faster than the conventional methods and systems.

Figure 4A:
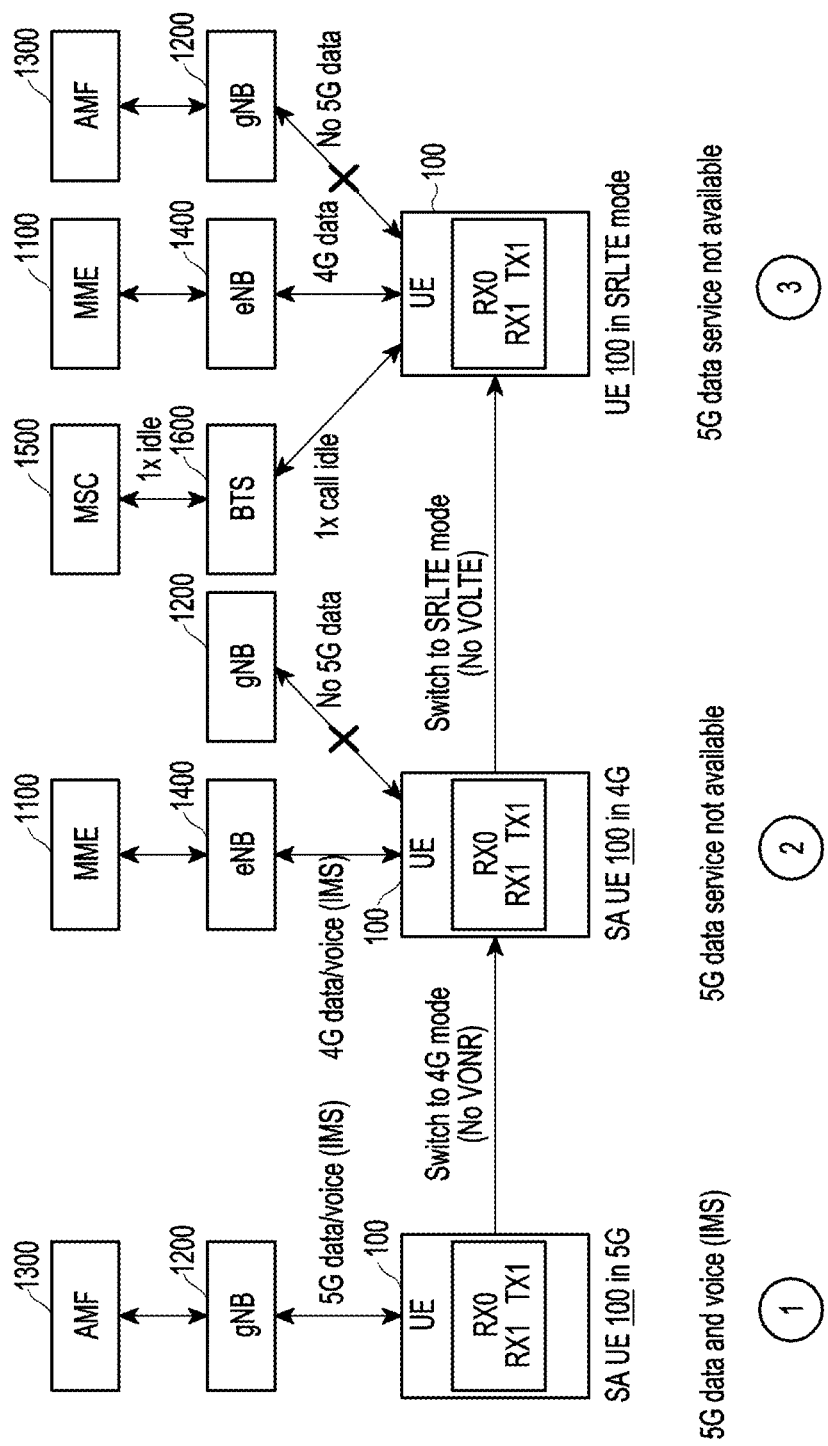
FIG. 4A illustrates a conventional mechanism adopted in the UE configured to operate in a single registration a single radio mode, according to a prior art.

FIG. 4A illustrates a conventional mechanism adopted in the UE (100) configured to operate in the single registration with the single radio mode, according to a prior art.

Referring to the FIG. 4A, consider that the UE (100) which is operating in the single registration and single radio mode has registered to the 5G network indicating voice centric device and PS Voice preferred. However, at step 1, the UE (100) determines that the 5G network does not support the VOLAR facility. At step 2, in response to determining that the 5G network does not support the VONAR, the UE (100) switches to the 4G network by registering to the 4G network with usage setting as voice centric and PS voice preferred. The UE (100) which is registered with both the 5G network and the 4G network does not support 5G data services at step 2.

Further, at step 3, the UE (100) determines that the VOLTE service is unavailable in the 4G network and switches to SRLTE mode. In the SRLTE mode, the UE (100) registers with the 1× network and the 4G network. Therefore, the UE (100) is not able to access the 5G data services.

Figure 4B:
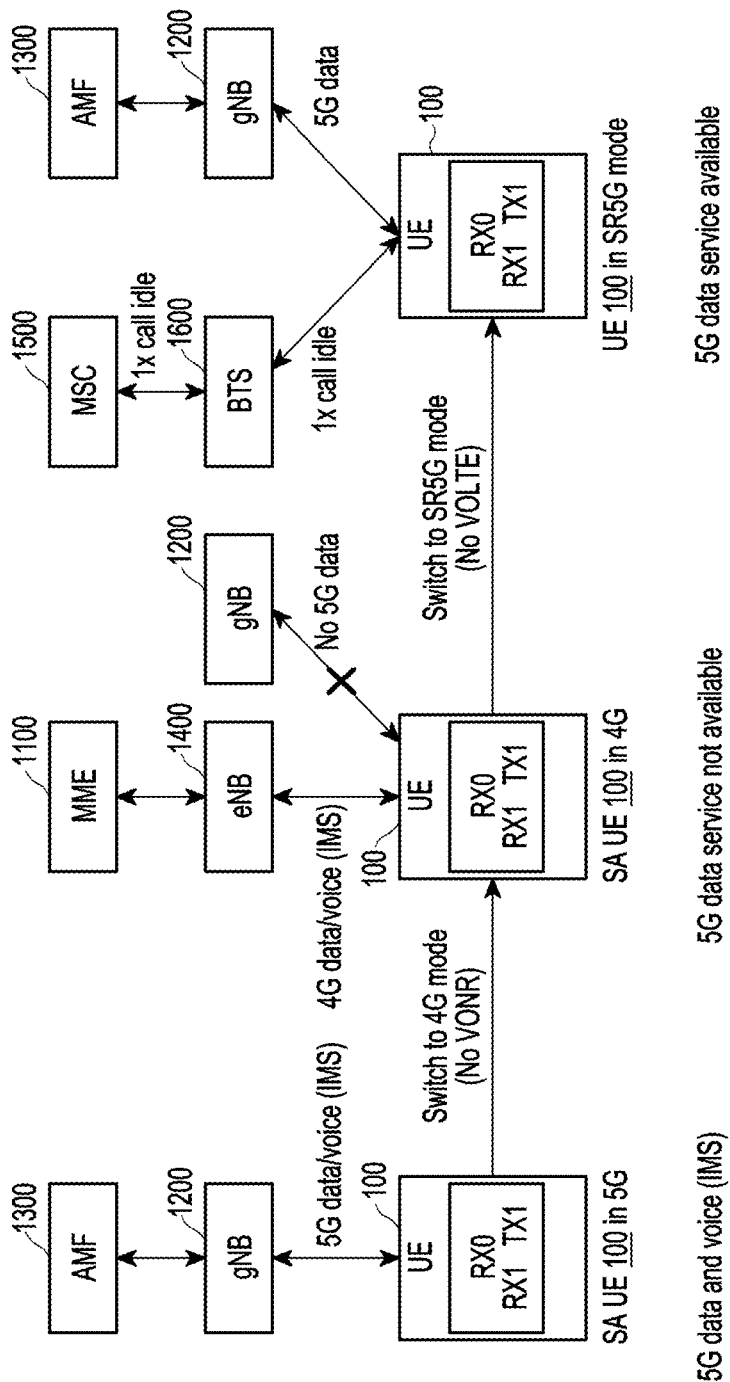
FIG. 4B illustrates a mechanism of the UE operating in the SR5G mode to provide the 5G data services when the UE is in an idle mode on the 1× core after checking for a Voice over LTE (VoLTE), according to an embodiment as disclosed herein.

FIG. 4B illustrates a mechanism of the UE (100) operating in the SR5G mode to provide the 5G data services when the UE (100) is in the idle mode on the 1× core (1000) after checking that the VOLTE, according to an embodiment as disclosed herein.

Referring to the FIG. 4B, in conjunction with the FIG. 4A, at step 3, in the proposed method the UE (100) is configured to switch to the SR5G mode to provide 5G data service when the UE (100) is in idle mode on the 1× core (1000). The SR5G mode allows the UE (100) to be simultaneously registered to the 5G network and the 1× core (1000) on the single transceiver. Therefore, according to the proposed method, the UE (100) operating in the single registration single radio mode will be able to support the 5G Services even when the VOLTE could be supported in the 4G in single registration mode.

Figure 4C:
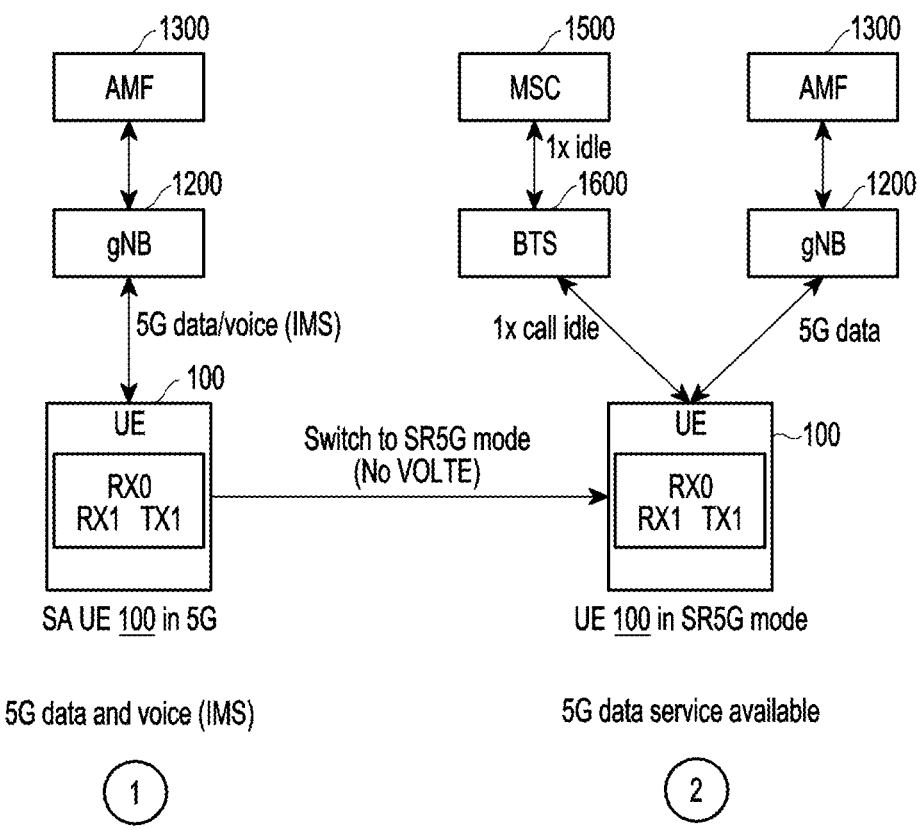
FIG. 4C illustrates a mechanism of the UE operating in the SR5G mode to provide the 5G data services when the UE is in the idle mode on the 1× core without checking for the VOLTE, according to an embodiment as disclosed herein.

FIG. 4C illustrates a mechanism of the UE (100) operating in the SR5G mode to provide the 5G data services when the UE (100) is in the idle mode on the 1× core (1000) without checking for the VOLTE, according to an embodiment as disclosed herein.

Referring to the FIG. 4C, in conjunction with the FIG. 4A, at step 2, in the proposed method the UE (100) is configured to switch to the SR5G mode to provide 5G data service when the UE (100) is in idle mode on the 1× core (1000). Therefore, according to the proposed method, the UE (100) operating in the single registration single radio mode on determining that the VOLAR service is not available, directly switches to the SR5G mode without checking for the VOLTE service by registering to the 4G network. The proposed method is adopted by the UE (100) when for certain users the 5G services is a priority over the VOLTE service and the user is willing to manage with the 1× call.

The proposed method in FIG. 4B and the proposed method in FIG. 4C are selected based on the requirements of the operator. Some Operators Provide VOLTE services without giving the 5G services, then the proposed method in FIG. 4B is adopted. Some other Operators may provide the 5G Services and the Voice on the 1× network, then the proposed method in FIG. 4C is adopted.

In another embodiment, the selection between the proposed method in FIG. 4B and the proposed method in FIG. 4C may be made based on the user preferences. Also, when the VOLTE call quality is poor, then the proposed method in FIG. 4C may be selected.

Figure 4D:
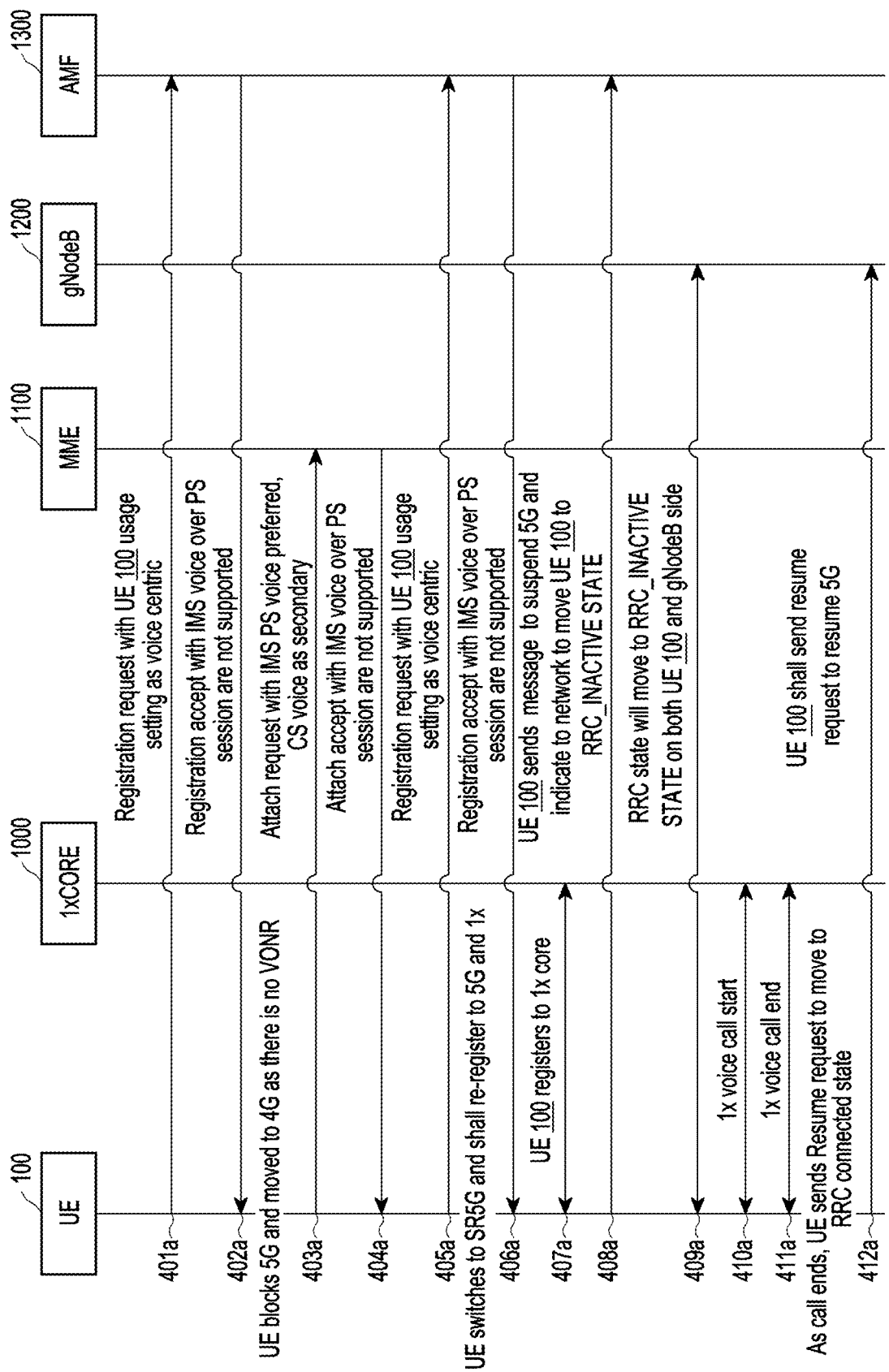
FIG. 4D illustrates a signaling diagram of the UE operating in the SR5G mode to provide the 5G data services when the UE is in the idle mode on the 1× core after checking for the VOLTE, according to an embodiment as disclosed herein.

FIG. 4D illustrates a signaling diagram of the UE (100) operating in the SR5G mode to provide the 5G data services when the UE (100) is in the idle mode on the 1× core (1000) after checking for the VOLTE, according to an embodiment as disclosed herein.

Referring to the FIG. 4D, at step 401a, the UE (100) registers to the 5G network without the VOLAR support by sending the registration request message with voice centric usage, to the AMF 1300. At step 402a, the UE (100) receives the registration accept message with an indication that the IMS voice over the PS sessions not supported.

At step 403a, the UE (100) registers to the 4G network in the single registration mode by sending an attach request with the IMS PS voice preferred and CS as secondary, to the MME (1100). At step 404a, the MME (1100) responds by sending the attach accept message indicating that the IMS voice over the PS sessions is not supported.

At step 405a, the UE (100) switches to the SR5G mode and re-registers to the 5G network and the 1× core (1000) without the VOLAR support by sending the registration request message with voice centric usage, to the AMF (1300). At step 406a, the UE (100) receives the registration accept message with an indication that the IMS voice over the PS sessions not supported. At step 407a, the UE (100) registers to the 1× core (1000)

At step 408a, the UE (100) determines that the call needs to be initiated. Therefore, the UE (100) sends a message to the 5G network to move the UE (100) to an RRC_INACTIVE state. In the RRC_INACTIVE state the registration of the UE (100) on the 5G network is suspended.

At step 409a, the UE (100) initiates the call on the 1× core (1000) and monitors the status of the call. At step 410a, the UE (100) determines that the call on the 1× core (1000) is ended. At step 411a, the UE (100) sends the resume request message to the 5G network. The resume request message resumes the 5G services at the UE (100) by moving the UE (100) to the RRC connected state.

Figure 4E:
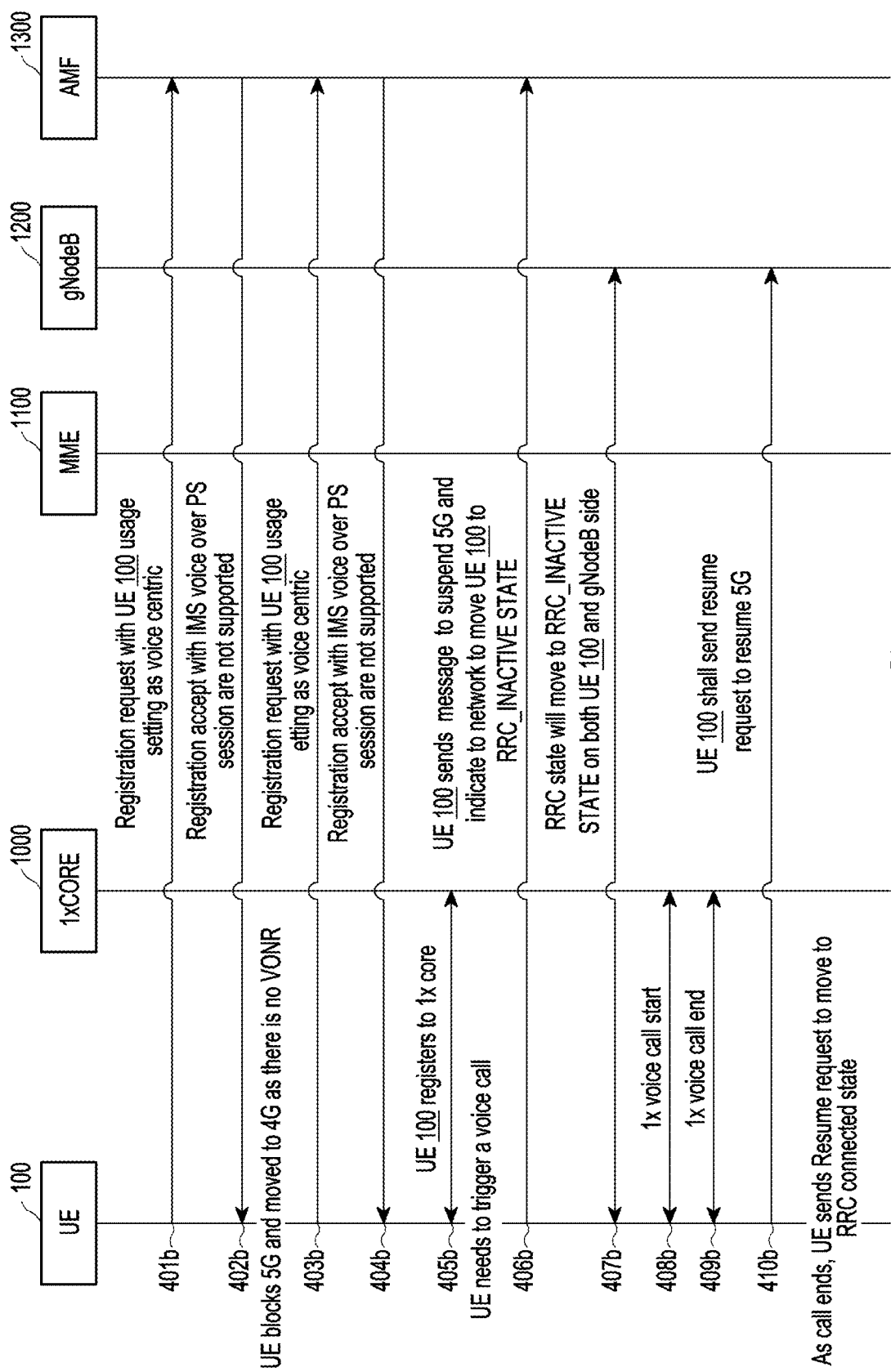
FIG. 4E illustrates a signaling diagram of the UE operating in the SR5G mode to provide the 5G data services when the UE is in the idle mode on the 1× core without checking for the VOLTE, according to an embodiment as disclosed herein.

FIG. 4E illustrates a signaling diagram of the UE (100) operating in the SR5G mode to provide the 5G data services when the UE (100) is in an idle mode on a 1× core (1000) without checking for the VOLTE, according to an embodiment as disclosed herein.

Referring to the FIG. 4E, in conjunction to the FIG. 4D, at step 401b, the UE (100) registers to the 5G network without the VOLAR support by sending the registration request message with voice centric usage, to the AMF (1300). At step 402b, the UE (100) receives the registration accept message with an indication that the IMS voice over the PS sessions not supported.

At step 403b, the UE (100) switches to the SR5G mode and re-registers to the 5G network and the 1× core (1000) without the VOLAR support by sending the registration request message with voice centric usage, to the AMF (1300). At step 404b, the UE (100) receives the registration accept message with an indication that the IMS voice over the PS sessions not supported. At step 405b, the UE (100) registers to the 1× core (1000).

At step 406b, the UE (100) determines that the call needs to be initiated. Therefore, the UE (100) sends a message to the 5G network to move the UE (100) to an RRC_INACTIVE state. In the RRC_INACTIVE state the registration of the UE (100) on the 5G network is suspended. At step 407b, the RRC state will move to the RRC_INACTIVE STATE on both the UE (100) and the gNodeB (1200).

At step 408b, the UE (100) initiates the call on the 1× core and monitors the status of the call. At step 409b, the UE (100) determines that the call on the 1× core (1000) is ended. At step 410b, the UE (100) sends the resume request message to the 5G network. The resume request message resumes the 5G services at the UE (100) by moving the UE (100) to the RRC connected state.

Figure 4F:
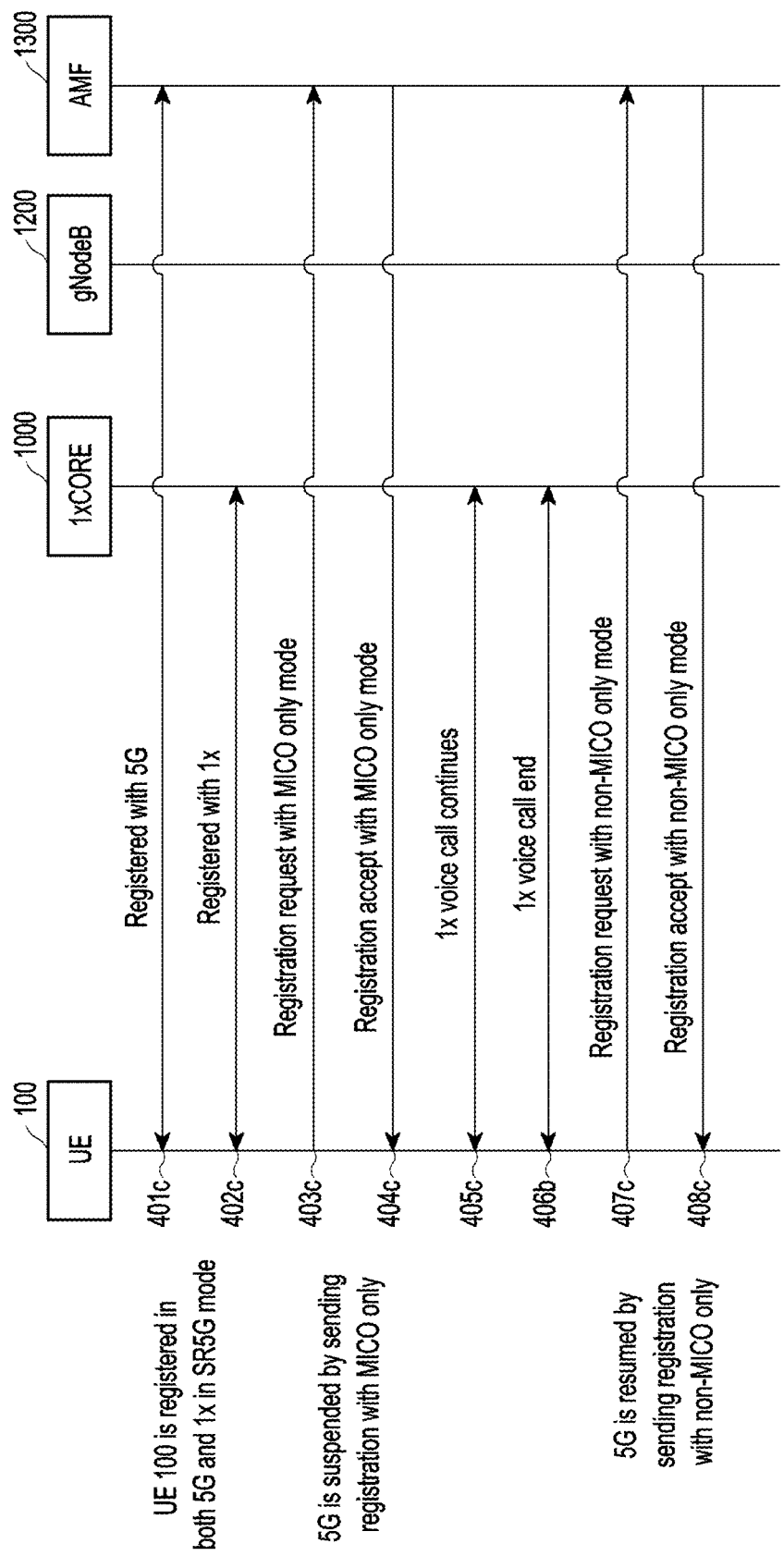
FIG. 4F illustrates a signaling diagram of the UE operating in the SR5G mode by suspending and resuming the 5G services, according to an embodiment as disclosed herein.

FIG. 4F illustrates a signaling diagram of the UE (100) operating in the SR5G mode by suspending and resuming the 5G services, according to an embodiment as disclosed herein.

Referring to the FIG. 4F, at step 401c, the UE (100) registers to the 5G network in the SR5G mode by sending the registration request message, to the AMF (1300). At step 402c, the UE (100) registers to the 1× core network (1000) in the SR5G mode by sending the registration request message, to the 1× core network (1000).

At step 403c, the UE (100) initiates the call on the 1× network (1000) and in response to initiating the call, the UE (100) determines that the downlink data transmission (i.e., 5G connectivity) needs to be suspended to accommodate the call. Further, the UE (100) sends a registration request message with mobile initiated connection only (MICO) only mode to the 5G network and suspends the downlink data transmission. Further, at step 404c, the UE (100) receives a registration accept message with the MICO only mode from the 5G network.

At step 405c, the UE (100) continues the 1× voice call and monitors the same. At step 406c, the UE (100) determines that the 1× voice call is ended. Further, at step 407c, the UE (100) resumes the downlink data transmission by sending the registration request message with non-MICO only mode to the 5G network. Further, at step 408c, the UE (100) receives the registration accept message with the non-MICO only mode from the 5G network.

Figure 4G:
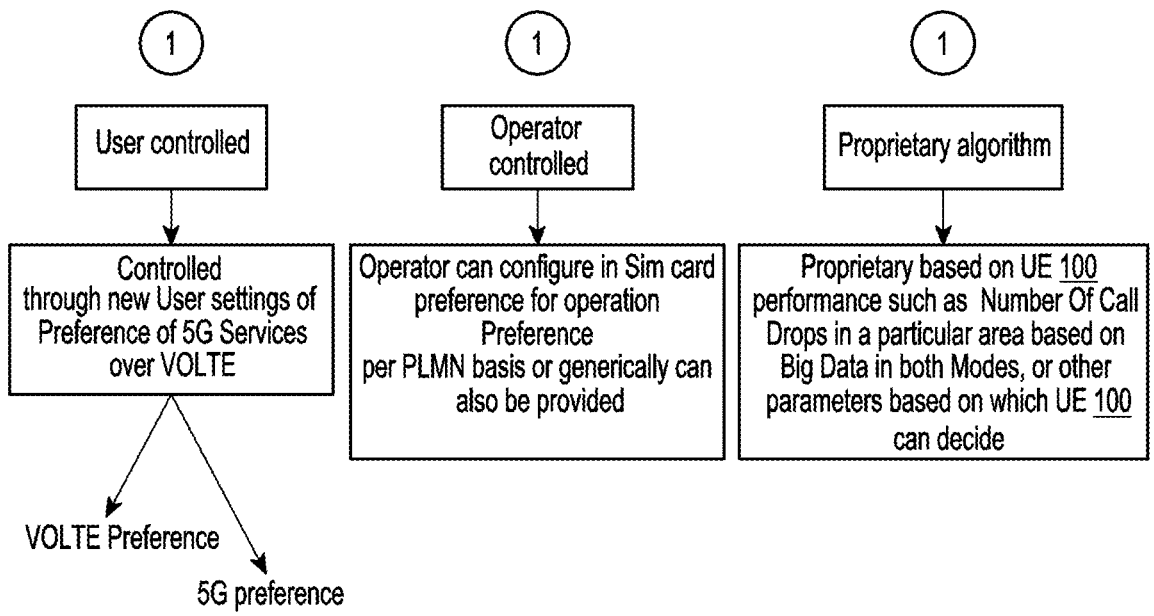
FIG. 4G illustrates various methods based on which the UE determines whether the VOLTE service needs to be checked, according to an embodiment as disclosed herein.

FIG. 4G illustrates the various methods based on which the UE (100) determines whether the VOLTE service needs to be checked, according to an embodiment as disclosed herein.

The proposed method described in the FIG. 4B and the FIG. 4C may be applied by the UE (100) after determining whether the VOLTE service needs to be checked based on the user preference, the operator preference and the proprietary rule.

In case 1, the UE (100) determines whether the VOLTE service needs to be checked based on the user preference. When there is a new user, then while providing the new User settings of preference, the user may prefer the 5G services over the VOLTE. Then the UE (100) directly switches to the SR5G mode without checking the availability of the VOLTE. In case the user prefers the VOLTE over the 5G services, then the UE (100) registers to the 4G network and checks whether the VOLTE is available before switching to the SR5G mode.

In case 2, the operator can configure in a SIM card the preference of the operator i.e., whether the operator prioritizes the 5G services or the VOLTE service based on which the proposed method in the FIG. 4A or the FIG. 4B is selected. Additionally the operator may also give the preference on a PLMN basis or generically i.e. the operator may configure a first PLMN to the proposed method described in the FIG. 4B and a second PLMN to the proposed method described in the FIG. 4C.

In case 3, a proprietary solution is provided which is based on a performance of the UE (100) such as for example, number of call drops in a particular area based on big data, in both the proposed method.

Figure 5A:
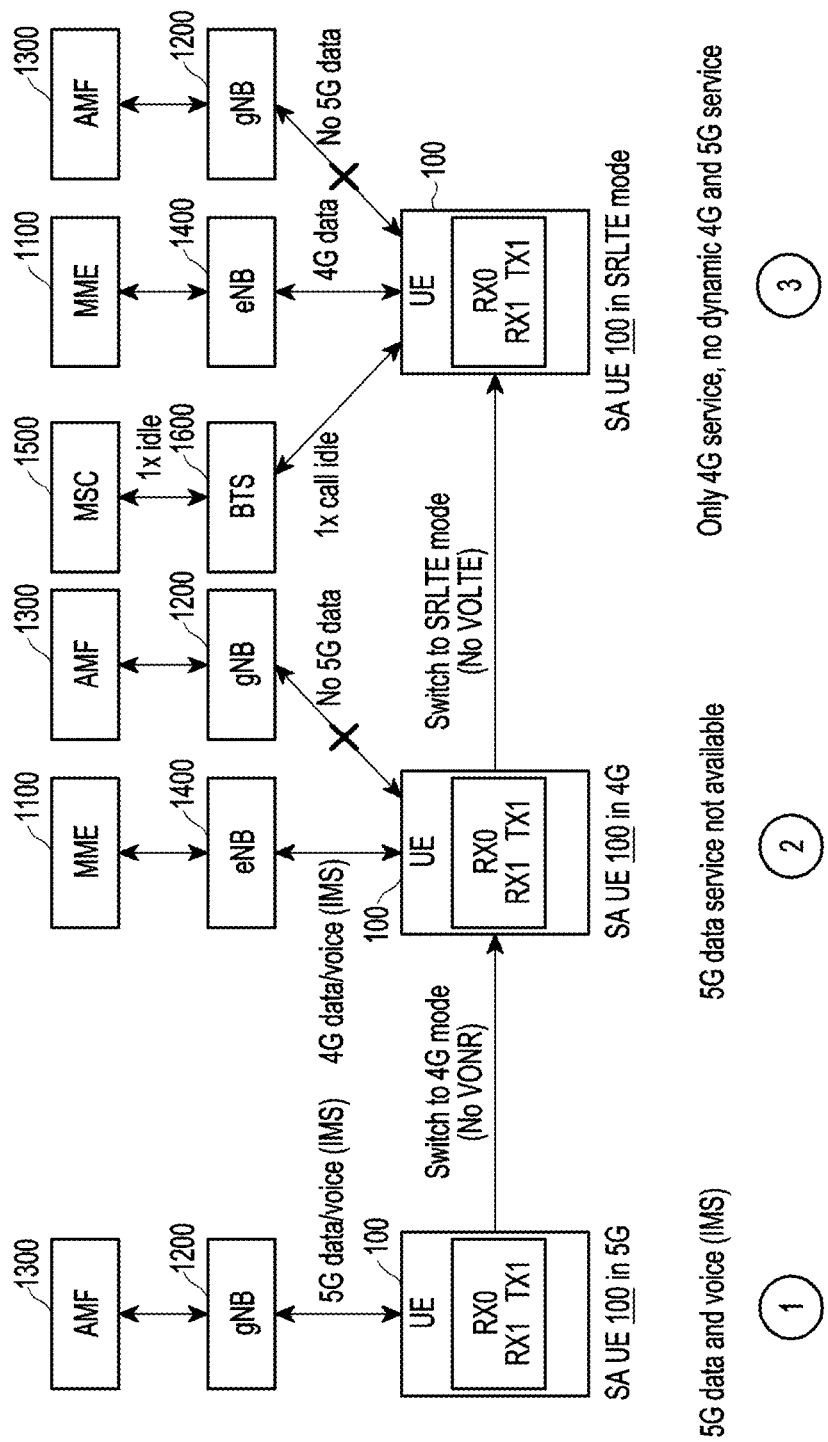
FIG. 5A illustrates a conventional mechanism adopted in the UE configured to operate in a dual registration with the single radio mode, according to a prior art.

FIG. 5A illustrates a conventional mechanism adopted in the UE (100) configured to operate in the dual registration with the single radio mode, according to a prior art.

Referring to the FIG. 5A, consider that the UE (100) which is operating in the dual registration and single radio mode has registered to the 5G network indicating voice centric device and PS Voice preferred. However, at step 1, the UE (100) determines that the 5G network does not support the VOLAR facility. At step 2, in response to determining that the 5G network does not support the VONAR, the UE (100) switches to the 4G network by registering to the 4G network with usage setting as voice centric and PS voice preferred. The UE (100) which is registered with both the 5G network and the 4G network does not support 5G data services at step 2.

Further, at step 3, the UE (100) determines that the VOLTE service is unavailable in the 4G network and switches to SRLTE mode. In the SRLTE mode, the UE (100) registers with the 1× core (1000) and the 4G network. Therefore, the UE (100) is not able to access the 5G data services.

Figure 5B:
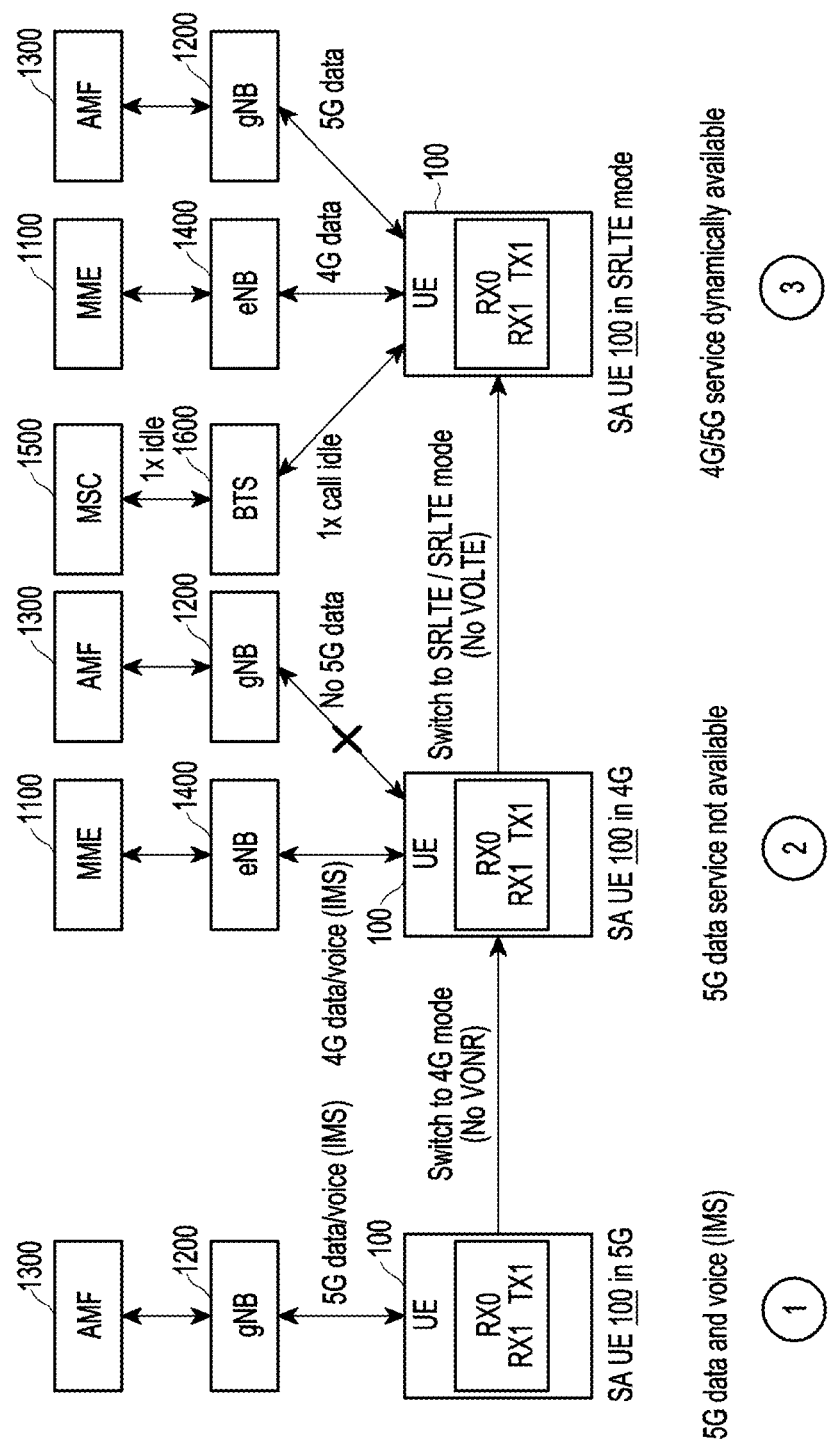
FIG. 5B illustrates a mechanism of the UE operating in the dual registration with the single radio mode providing the 4G services and the 5G services by dynamically switching between the SRLTE mode and the SR5G mode, according to an embodiment as disclosed herein.

FIG. 5B illustrates a mechanism of the UE (100) operating in the dual registration with the single radio mode providing the 4G services and the 5G services by dynamically switching between the SRLTE mode and the SR5G mode, according to an embodiment as disclosed herein.

Referring to the FIG. 5B, in conjunction with the FIG. 5A, at step 3, in the proposed method the UE (100) is configured to operate by dynamically switching between the SRLTE mode and the proposed SR5G mode. Therefore, in the proposed method the UE (100) provides both the 4G data services and the 5G data services by dynamically switching between the SRLTE mode and the SR5G mode. Further, the UE (100) switches between the SRLTE mode and the SR5G mode based on at least one of the user preference, the operator preference, the active Public data network (PDN) on one of the 4G Radio Access Technology (RAT) and the 5G RAT, the active data network name (DNN) on one of the 4G RAT and the 5G RAT, the application data request, the user history, the signal quality, the transmission power limitation. The SR5G mode allows the UE (100) to be simultaneously registered to the 5G network and the 1× core (1000) on the single transceiver.

Figure 5C:
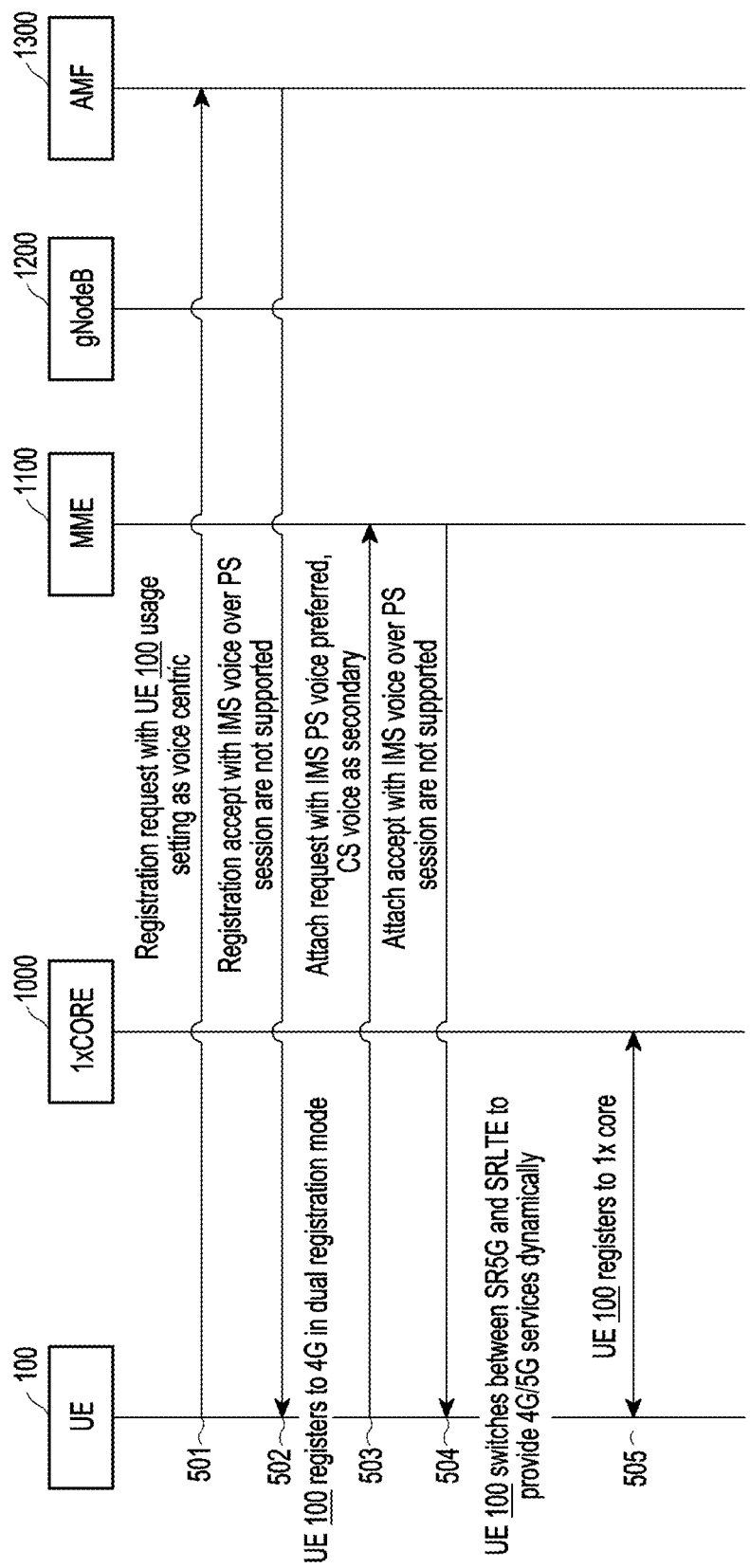
FIG. 5C illustrates a signaling diagram of the UE operating in the dual registration with the single radio mode, providing the 4G services and the 5G services at the UE by dynamically switching between the SRLTE mode and the SR5G mode, according to an embodiment as disclosed herein.

FIG. 5C illustrates a signaling diagram of the UE (100) operating in the operate in the dual registration with the single radio mode, providing the 4G services and the 5G services at the UE (100) by dynamically switching between the SRLTE mode and the SR5G mode, according to an embodiment as disclosed herein.

Referring to the FIG. 5C, at step 501, the UE (100) registers to the 5G network without the VOLAR support by sending the registration request message with voice centric usage, to the AMF 1300.

At step 502, the UE (100) receives the registration accept message with an indication that the IMS voice over the PS sessions not supported.

At step 503, the UE (100) registers to the 4G network in the dual registration mode by sending an attach request with the IMS PS voice preferred and CS as secondary, to the MME (1100). At step 504, the MME (1100) responds by sending the attach accept message indicating that the IMS voice over the PS sessions is not supported.

At step 505, the UE (100) also registers to the 1× core (1000) and initiates a call on the 1× core (1000).

Further, the UE (100) will switch between the SRLTE mode and the SR5G mode to dynamically provide the 4G data service and the 5G data service respectively, during the 1× call since the UE (100) is camped to the 1× core (1000) for voice communication in both the SRLTE mode and the SR5G mode.

When the UE (100) switches from the SRLTE mode to the SR5G mode, the UE (100) sends the Non-access stratum (NAS) message to the 5G network to move the UE (100) to an RRC_INACTIVE state. In the RRC_INACTIVE state the registration of the UE (100) on the 5G network is suspended. Further, the UE (100) determines that the call on the 1× core (1000) is ended and then sends the resume request message to the 5G network. The resume request message resumes the 5G Services of the UE (100) by moving the UE (100) to the RRC connected state.

Figure 6A:
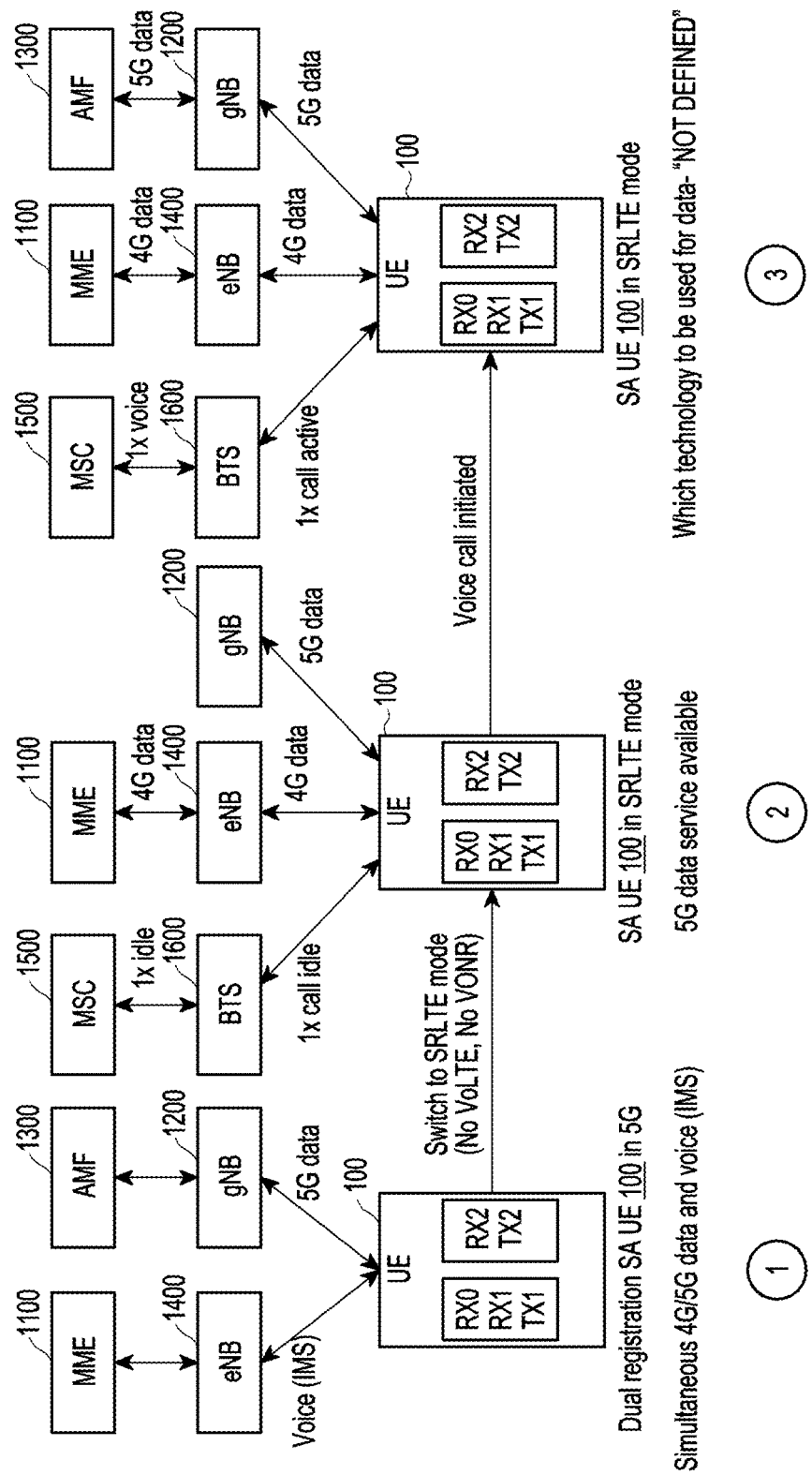
FIG. 6A illustrates a conventional mechanism adopted in the UE configured to operate in the dual registration with a dual radio, according to a prior art.

FIG. 6A illustrates a conventional mechanism adopted in the UE (100) configured to operate in the dual registration with dual radio, according to a prior art.

Referring to the FIG. 6A, consider that the UE (100) has registered to the 4G network on the first transceiver (T1) (120) and to the 5G network on the second transceiver (T2) (140) in the dual registration mode with dual radio. However, at step 1, the UE (100) determines that the registration in both the 4G network and the 5G network in the dual registration mode with dual radio does not support the VOLAR facility.

At step 2, the UE (100) switches to the SRLTE mode on determining that the registration in both the 4G network and the 5G network in the Dual Registration Mode with Dual Radio does not support the VOLTE facility. In the SRLTE mode, the UE (100) registers with the 5G network on the second transceiver (T2) (140) and one of the 4G network and the 1× core (1000) on the first transceiver (T1) (120), simultaneously. At step 2, the 1× voice call is idle and hence the 4G service is available at the UE (100) on the first transceiver (T1) (120).

At step 3, the UE (100) initiates the 1× voice call and hence activates the 1× core (1000) on the T1 (120). Since, the 1× core (1000) is activated on the T1 (120), the 4G services may not be provided. Further, the UE (100) may disconnect from the 5G network and activate the 4G services on the T2 (140). Therefore, in the conventional methods and systems there is no pre-defined mechanism based on which the UE (100) decides whether the 5G services are to be activated or the 4G services are to be activated.

Figure 6B:
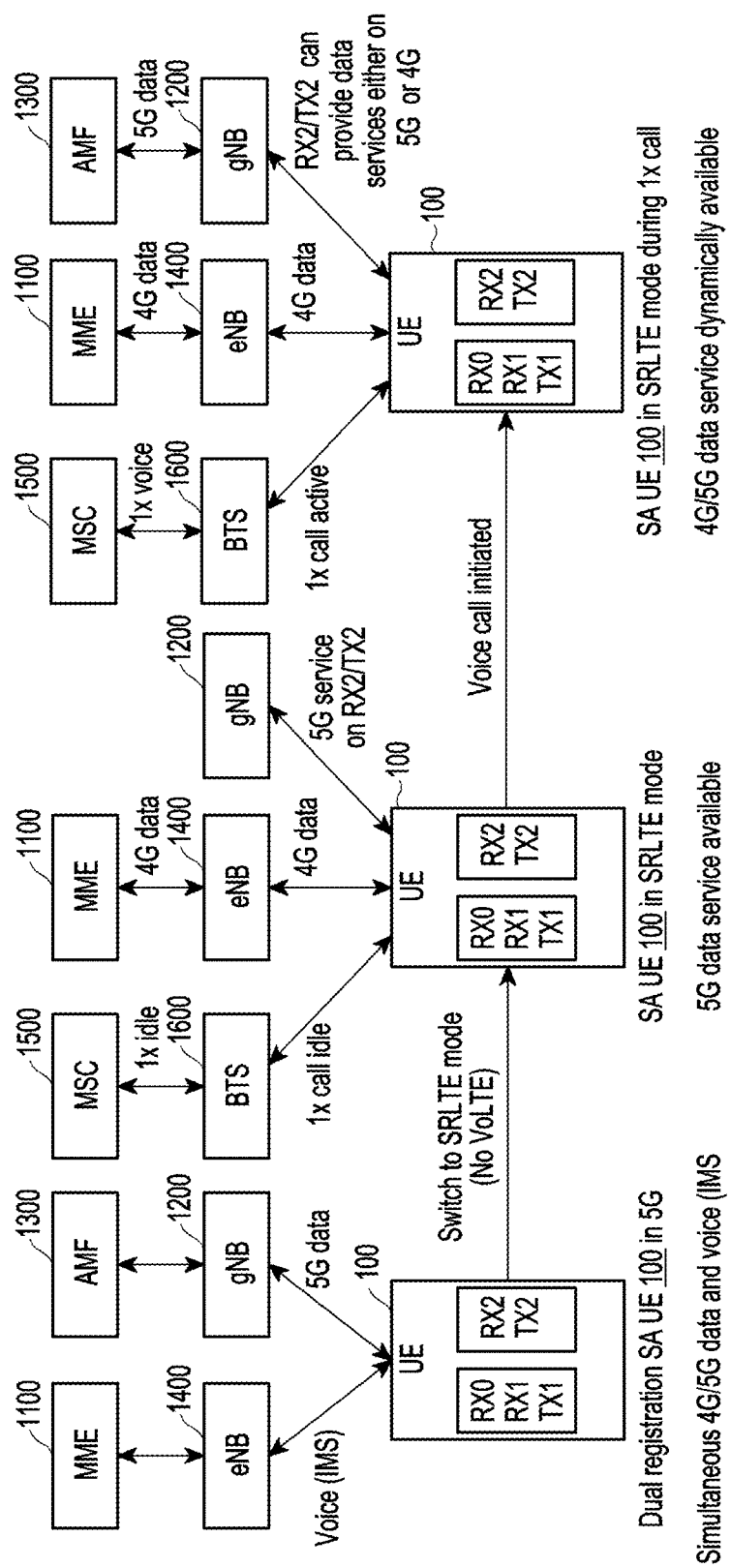
FIG. 6B illustrates a mechanism of providing the data services by the UE dynamically on one of the 4G network and the 5G network, according to an embodiment as disclosed herein.

FIG. 6B illustrates a mechanism of providing the data services dynamically on one of the 4G network and the 5G network, according to an embodiment as disclosed herein.

Referring to the FIG. 6B, in conjunction with the FIG. 6A, at step 3, in the proposed method the UE (100) dynamically decides whether the 5G services are to be activated or the 4G services are to be activated based on at least one of the plurality of parameters. The plurality of parameters include the user preference during the 1× call, the operator preference during the 1× call, the active Public data network (PDN) on one of the 4G Radio Access Technology (RAT) and the 5G RAT, the active data network name (DNN) on one of the 4G RAT and the 5G RAT, the application data request during the call, the user history, the signal quality, the transmission power limitation and interference with the call signal.

Therefore, unlike to the conventional methods and systems, in the proposed method the UE (100) dynamically decides by taking into consideration the plurality of parameters. Further, the decision may be taken based on a single parameter of the plurality of parameters or a set of parameters from the plurality of parameters.

Figure 6C:
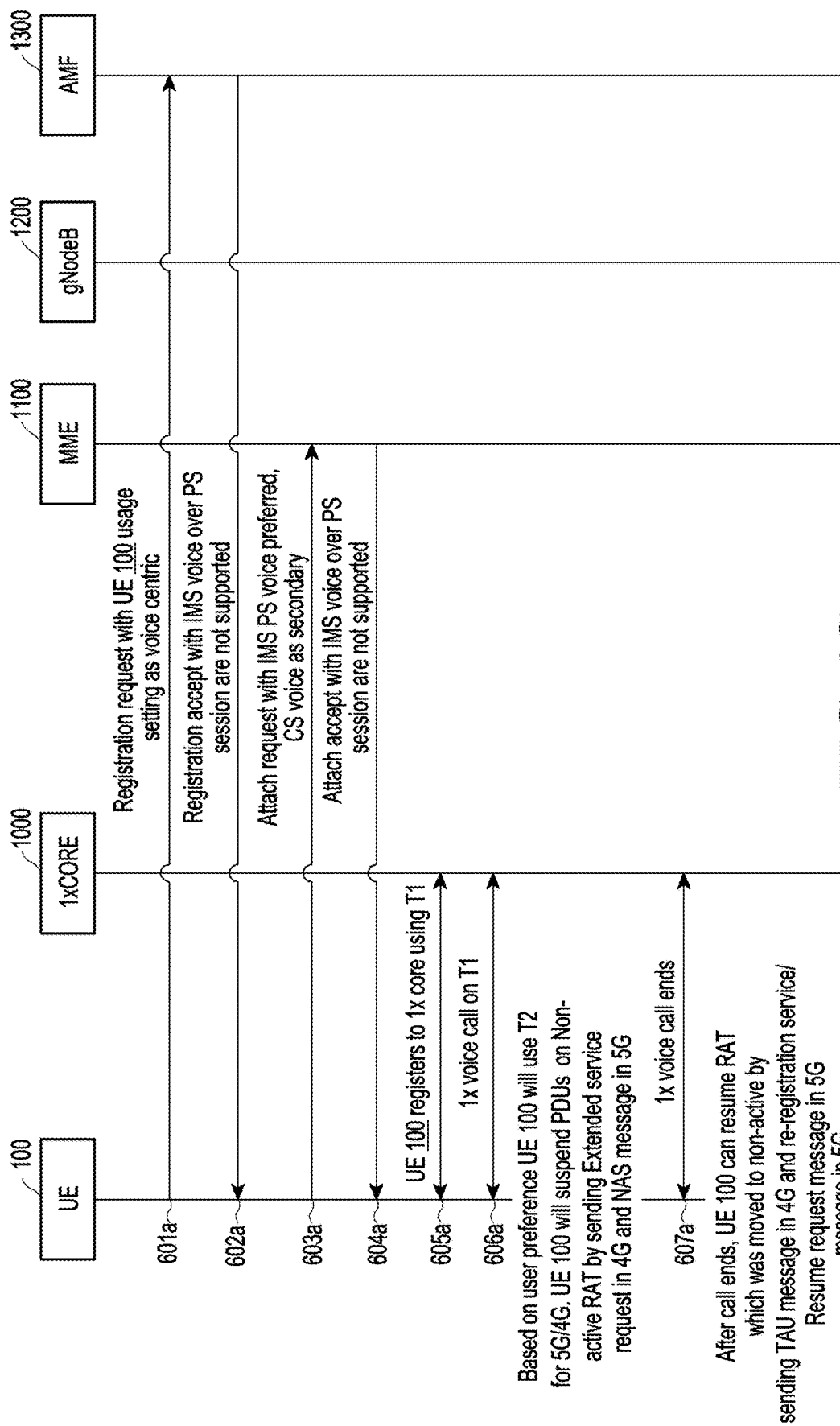
FIG. 6C illustrates a signaling diagram of the UE dynamically providing the data on one of the 5G network and the 4G network by suspending the protocol data units (PDU) on a non-active radio access technology (RAT), according to an embodiment as disclosed herein.

FIG. 6C is a signaling diagram illustrating the UE (100) dynamically providing the data on one of the 5G network and the 4G network by suspending the PDU on the non-active RAT, according to an embodiment as disclosed herein.

Referring to the FIG. 6C, at step 601a, the UE (100) registers to the 5G network without the VOLAR support by sending the registration request message with voice centric usage, to the AMF 1300 over the T2 (140).

At step 602a, the UE (100) receives the registration accept message with an indication that the IMS voice over the PS sessions not supported from the AMF 1300.

At step 603a, the UE (100) registers to the 4G network by sending an attach request with the IMS PS voice preferred and CS as secondary, to the MME over the T1 (120). At step 604a, the MME (1100) responds by sending the attach accept message indicating that the IMS voice over the PS sessions is not supported. Further, at step 605a, the UE (100) also registers to the 1× core (1000) using the T1 (120).

At step 606a, the UE (100) initiates the 1× call on the T1 (120). The UE (100) dynamically determines based on the user preference, whether the T2 (140) can be used for providing the data on one of the 5G network and the 4G network. Further, on determining which of the RATs is needed to provide the data, the UE (100) suspends the PDU on the non-active RAT. In case the non-active RAT is the 4G RAT then the UE (100) suspends the 4G RAT by sending the extended service request. In case the non-active RAT is the 5G RAT then the UE (100) suspends the 5G RAT by sending the NAS message.

At step 607a, the UE (100) determines that the 1× call has been terminated. In response to determining that the 1× call has been terminated, the UE (100) may resume the RAT which was suspended by sending the TAU message in case the suspended RAT was the 4G RAT. In case, the suspended RAT was the 5G RAT then the UE (100) can resume the RAT by sending one of the re-registration request to the AMF, the resume request and the service request to the 5G RAT.

Therefore, in the proposed method the UE (100) dynamically determines based on the user preference, whether the T2 (140) can be used for providing the data on one of the 5G network and the 4G network. Further, on determining the network to be used, the UE (100) provides the data on the determined network by suspending the PDU on the non-active RAT (i.e., the RAT other than the one determined to provide the data service).

Figure 6D:
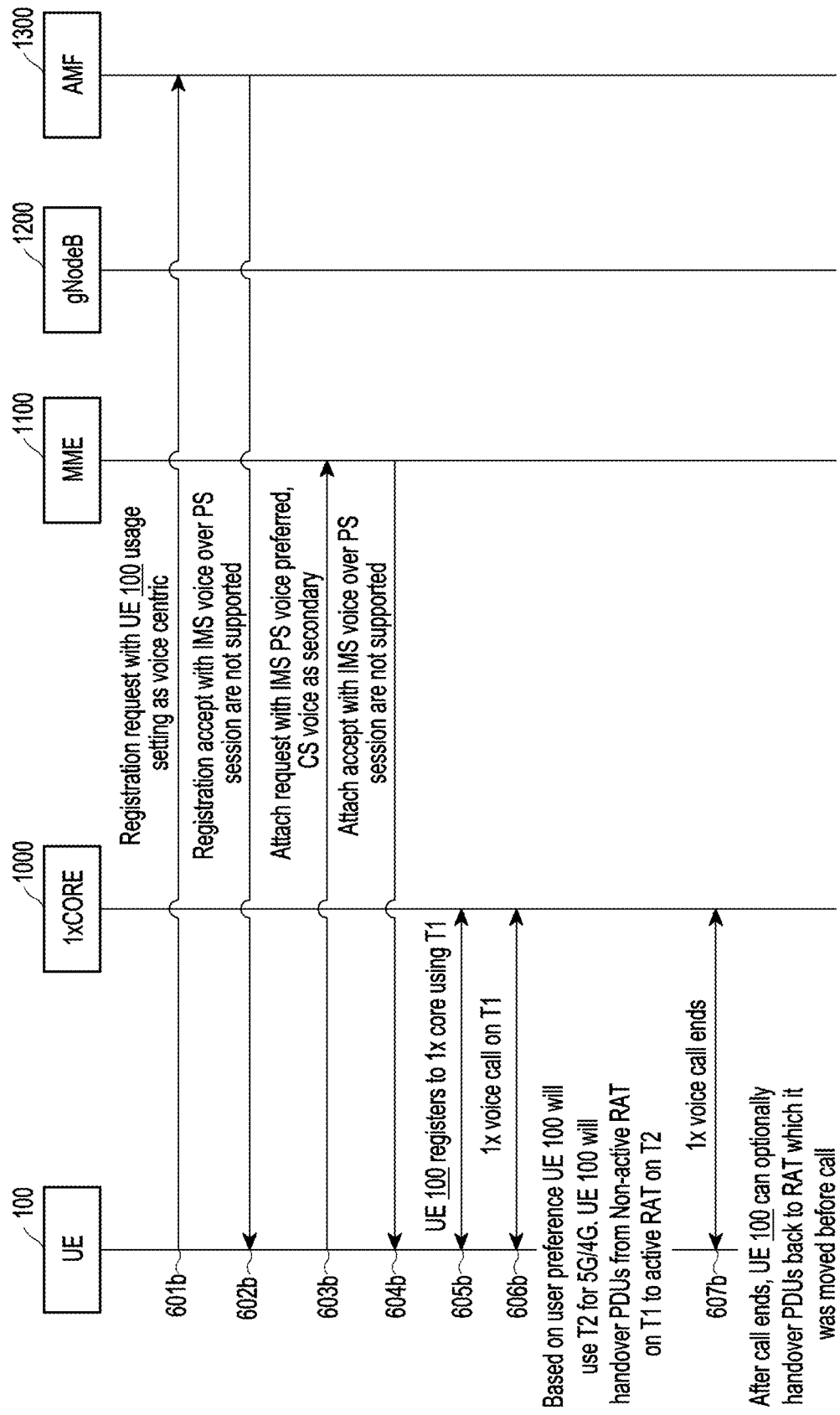
FIG. 6D illustrates a signaling diagram of the UE dynamically providing a data on one of the 5G network and the 4G network by performing the Protocol Data Unit (PDU) handover from the non-active Radio Access Technology (RAT) to an active RAT, according to an embodiment as disclosed herein.

FIG. 6D illustrates a signaling diagram of the UE (100) dynamically providing the data on one of the 5G network and the 4G network by performing the Protocol Data Unit (PDU) handover from the non-active Radio Access Technology (RAT) to the active RAT, according to an embodiment as disclosed herein.

Referring to the FIG. 6D in conjunction to the FIG. 6C, at step 606b, the UE (100) initiates the 1× call on the T1 (120). The UE (100) dynamically determines based on the user preference, whether the T2 (140) can be used for providing the data on one of the 5G network and the 4G network. Further, on determining which of the RATs is needed to provide the data, the UE (100) performs the handover of the PDU from the non-active RAT on the T1 (120) to the active RAT on the T2 (140).

At step 607b, the UE (100) determines that the 1× call has been terminated. In response to determining that the 1× call has been terminated, the UE (100) may optionally handover the PDUs back to the RAT (i.e., the non-active RAT) from which the PDUs were moved before the 1× call.

Therefore, in the proposed method the UE (100) dynamically determines based on the user preference, whether the T2 (140) can be used for providing the data on one of the 5G network and the 4G network. Further, on determining the network to be used, the UE (100) provides the data on the determined network by performing the PDU handover from the non-active RAT to the active RAT.

Figure 6E:
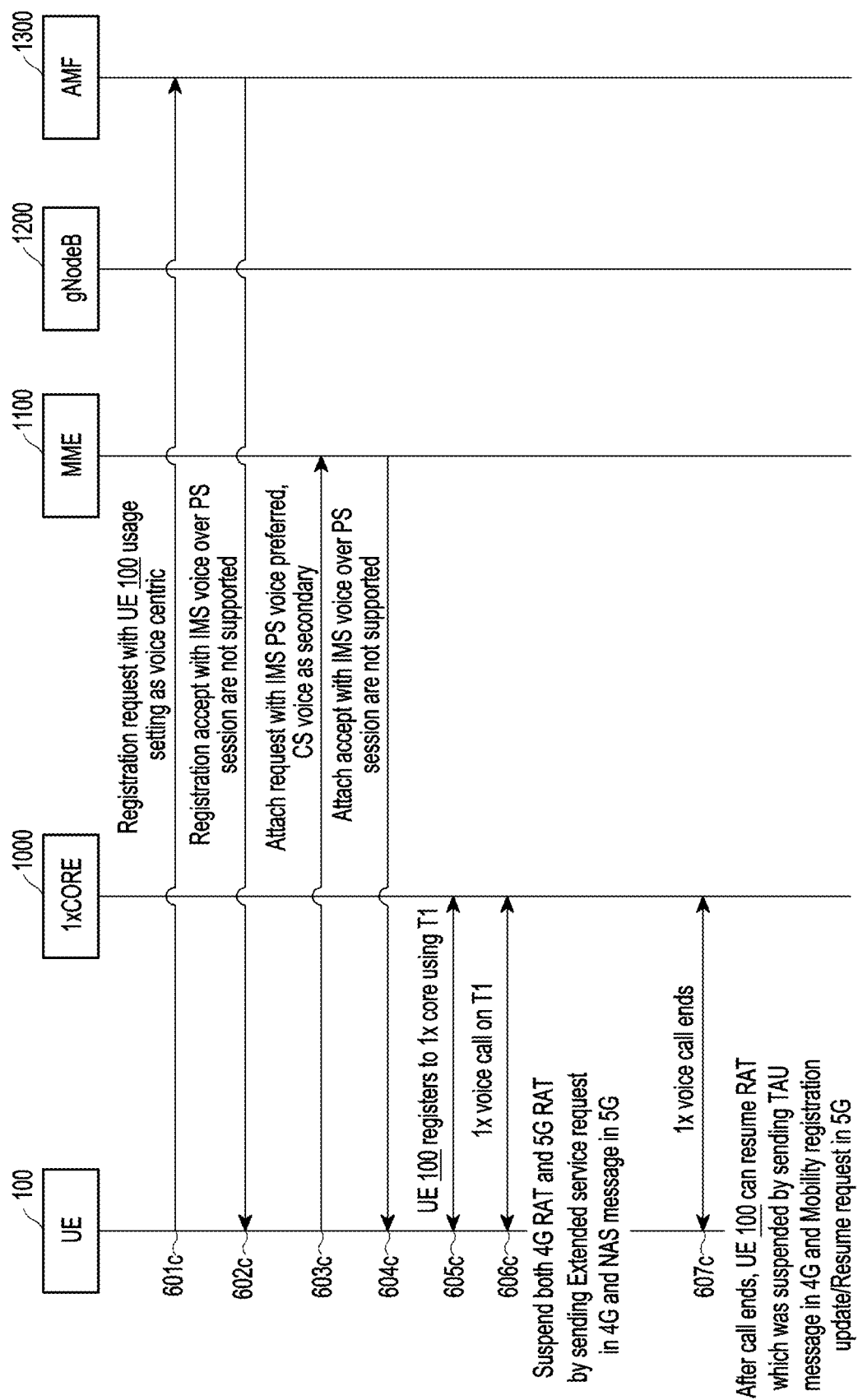
FIG. 6E illustrates a signaling diagram of the UE dynamically providing the data on one of the 5G network and the 4G network by suspending both a 4G RAT and a 5G RAT, according to an embodiment as disclosed herein.

FIG. 6E illustrates a signaling diagram of the UE (100) dynamically providing the data on one of the 5G network and the 4G network by suspending both the 4G RAT and the 5G RAT, according to an embodiment as disclosed herein.

Referring to the FIG. 6E in conjunction to the FIG. 6C, at step 606c, the UE (100) initiates the 1× call on the T1 (120). Further, the UE (100) suspends the 4G RAT by sending the extended service request and the UE (100) suspends the 5G RAT by sending the NAS message.

At step 607c, the UE (100) determines that the 1× call has been terminated. In response to determining that the 1× call has been terminated, the UE (100) resumes the 4G RAT which was suspended by sending the TAU message in 4G network and the UE (100) resumes the 5G RAT which was suspended by sending the mobility registration update/resume request in the 5G network.

Therefore, in the proposed method the UE (100) dynamically provides the data on one of the 5G network and the 4G network by suspending both the 4G RAT and the 5G RAT.

Figure 7A:
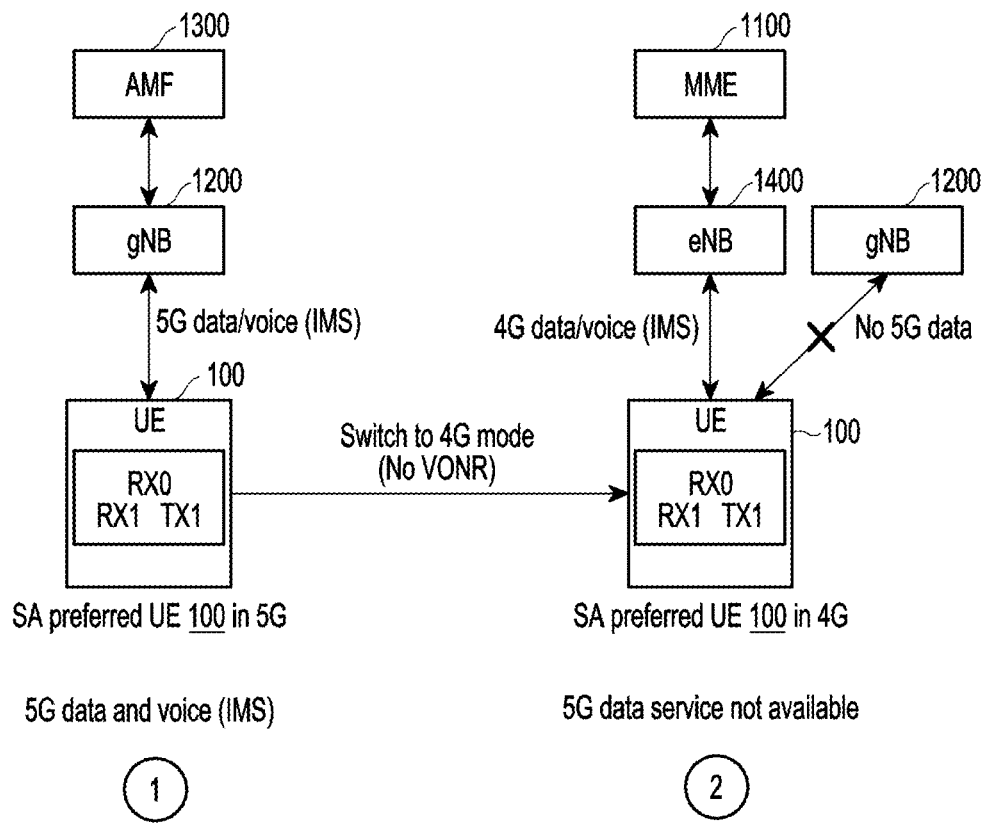
FIG. 7A illustrates configurations of the conventional 5G network while operating in a non-voice over new radio (VOLAR) scenario to provide the 5G data service, according to prior art.

FIG. 7A illustrates configurations of the conventional 5G network while operating in the non-VOLAR scenario to provide the 5G data service, according to prior art.

Referring to the FIG. 7A, consider that the VOLAR is not supported by the 5G network and that the UE (100) is capable of supporting dual transmission and reception.

At step 1, the UE (100) registers to the 5G network in the stand alone mode in the single registration without the VOLAR support. At step 2, the UE (100) switches to the VOLTE and provides the 4G data and voice communication. Therefore, the UE (100) will not be able to provide the 5G services.

Figure 7B:
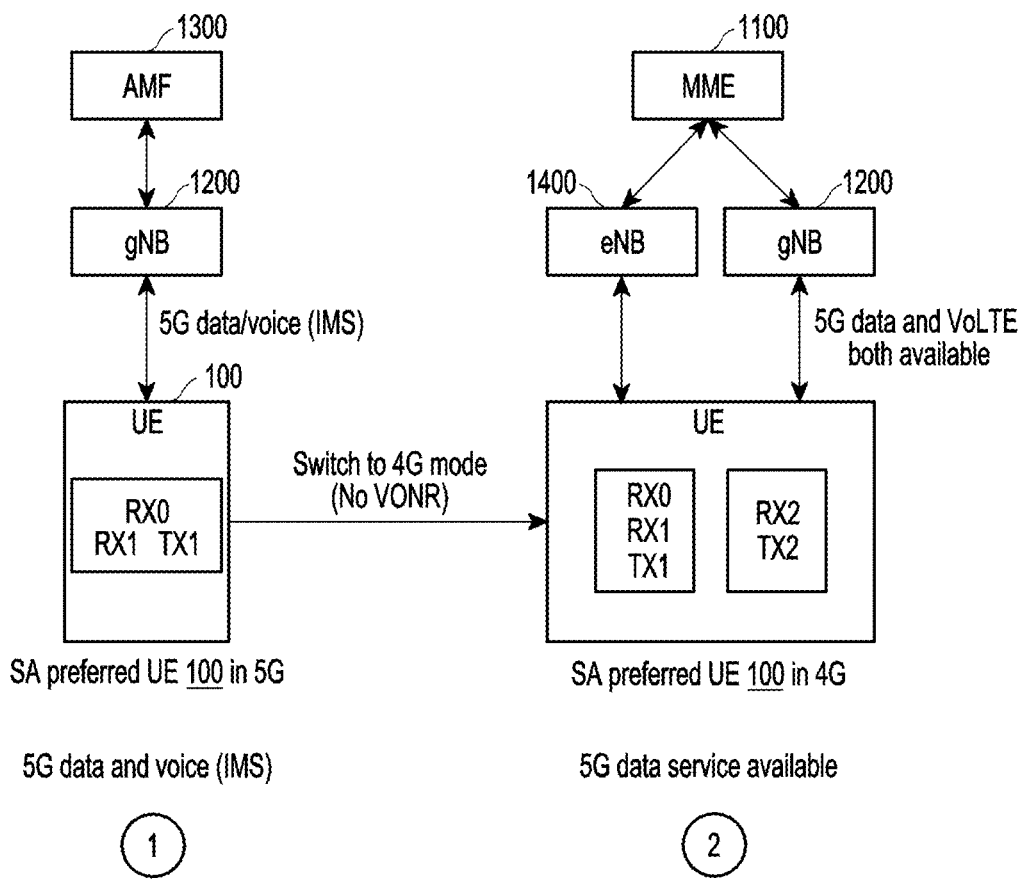
FIG. 7B illustrates the configurations of the 5G network while operating the UE in the ENDC mode during the non-VOLAR scenario to provide the 5G data service, according to an embodiment as disclosed herein.

FIG. 7B illustrates the configurations of the 5G network while operating the UE (100) in the ENDC mode during the non-VONR scenario to provide the 5G data service, according to an embodiment as disclosed herein.

Referring to the FIG. 7B in conjunction with FIG. 7A, at step 2, the UE (100) determines whether the UE (100) possesses a capability to operate in the ENDC mode which supports the VOLTE services and the 5G services. Further, the UE (100) switches from the standalone (SA) mode to the ENDC mode for providing the 5G services due to the unavailability of the VONR service.

The ENDC stands for evolved-Universal Terrestrial Radio Access (E-UTRAN) New Radio-Dual Connectivity, in standards parlance. According to 3GPP standards, the ENDC mode allows the UE (100) to connect to the eNB (1400) that acts as a master node and a gNB (1200) that acts as a secondary node. Therefore, in the ENDC mode, the UE (100) supports both the VOLTE services and the 5G Data services.

However, not all UEs (100) support the ENDC mode and only certain UE (100) will provide the 5G services even during the unavailability of the VONR.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for providing $5^{th}$ generation (5G) services to a user equipment (UE), in a wireless communication network, the method comprising:
registering, by the UE, to a 4G network on a first transceiver and to a 5G network with a usage on a second transceiver in a dual registration mode with dual radio;
while the UE is registered to the 4G network on the first transceiver and to the 5G network, detecting, by the UE, an unavailability of a voice over new radio (VOLAR) service and a voice over long term evolution (LTE) (VOLTE) service at the UE;
in response to detecting the unavailability of the VOLAR service and the VOLTE service at the UE, configuring the UE to operate a single radio LTE (SRLTE) mode on the first transceiver with being registered to the 5G network on the second transceiver, wherein the UE is registered to one of the 4G network and 1× core on the first transceiver in the SRLTE mode;
while the UE operates in the SRLTE mode on the first transceiver with being registered to the 5G network on the second transceiver, initiating 1× voice call on the first transceiver;
in response to initiating the 1× voice call on the first transceiver while the UE operates in the SRLTE mode on the first transceiver with being registered to the 5G network on the second transceiver, determining whether to provide 4G services or 5G services on the second transceiver; and
providing the 4G services or the 5G services based on the determination.

2. The method of claim 1, further comprising:
performing, by the UE, one of a Protocol Data Unit (PDU) handover from a non-active Radio Access Technology (RAT) to an active RAT, suspending the PDU on the non-active RAT, or suspending a 4G RAT and a 5G RAT;
determining, by the UE, that a 1× voice call on the 1× core is ended; and
performing, by the UE, one of resuming the RAT which was suspended by sending a TAU message in the 4G network and a mobility registration update/resume request in the 5G network, or handing over the PDUs back to the RAT from which was moved before the 1× voice call.

3. The method of claim 2, wherein the 4G RAT is suspended by sending an extended service request and the 5G RAT is suspended by sending a Non-access stratum (NAS) message.

4. The method of claim 1, wherein whether to provide the 4G services or the 5G services on the second transceiver is determined based on at least one of a plurality of parameters comprising transmission power limitation and interference with the 1× voice call.

5. A user equipment (UE) for providing $5^{th}$ generation (5G) services in a wireless communication network, comprising:
a memory; and
a processor coupled to the memory and configured to:
register to a 4G network on a first transceiver and to a 5G network on a second transceiver in a dual registration mode with dual radio,
while the UE is registered to the 4G network on the first transceiver and to the 5G network on the second transceiver, detect an unavailability of a voice over new radio (VOLAR) service and a voice over long term evolution (LTE) (VOLTE) service at the UE, and
in response to detecting the unavailability of the VOLAR service and the VOLTE service at the UE, configure the UE to operate in a single radio LTE (SRLTE) mode on the first transceiver with being registered to the 5G network on the second transceiver, wherein the UE is registered to one of the 4G network and 1× core on the first transceiver in the SRLTE mode,
while the UE operates in the SRLTE mode on the first transceiver with being registered to the 5G network on the second transceiver, initiate 1× voice call on the first transceiver,
in response to initiating the 1× voice call on the first transceiver while the UE operates in the SRLTE mode on the first transceiver with being registered to the 5G network on the second transceiver, determine whether to provide 4G services or 5G services on the second transceiver, and
provide the 4G services or the 5G services based on the determination.

6. The UE of claim 5, wherein the processor is further configured to:
perform one of a Protocol Data Unit (PDU) handover from a non-active Radio Access Technology (RAT) to an active RAT, suspend the PDU on the non-active RAT, or suspend a 4G RAT and a 5G RAT;
determine that a 1× voice call on the 1× core is ended; and perform one of resume the RAT which was suspended by sending a TAU message in the 4G network and a mobility registration update/resume request in the 5G network, or handover the PDUs back to the RAT from which was moved before the 1× voice call.

7. The UE of claim 6, wherein the 4G RAT is suspended by sending an extended service request and the 5G RAT is suspended by sending a Non-access stratum (NAS) message.

8. The UE of claim 5, wherein the processor is configured to determine whether to provide the 4G services or the 5G services on the second transceiver based on at least one of a plurality of parameters comprising transmission power limitation and interference with the 1× voice call.

* * * * *